US012641470B2

(12) United States Patent
Patil et al.

(10) Patent No.: US 12,641,470 B2
(45) Date of Patent: May 26, 2026

(54) THERMAL-BASED UE AGGREGATION FOR VEHICULAR COMMUNICATION

(71) Applicant: QUALCOMM Incorporated, San Diego, CA (US)

(72) Inventors: Shailesh Patil, San Diego, CA (US); Vivek Khanna, San Diego, CA (US); Gene Wesley Marsh, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/187,552

(22) Filed: Mar. 21, 2023

(65) Prior Publication Data

US 2024/0323744 A1     Sep. 26, 2024

(51) Int. Cl.
*H04W 28/02*          (2009.01)
*H04W 72/1263*      (2023.01)

(52) U.S. Cl.
CPC ... *H04W 28/0215* (2013.01); *H04W 28/0278* (2013.01); *H04W 72/1263* (2013.01)

(58) Field of Classification Search
CPC ......... H04W 28/0215; H04W 28/0278; H04W 28/08; H04W 28/0268; H04W 72/1263;
(Continued)

(56) References Cited

U.S. PATENT DOCUMENTS

2016/0309345 A1* 10/2016 Tehrani ............. H04W 28/0861
2016/0338094 A1  11/2016 Faurie et al.
(Continued)

FOREIGN PATENT DOCUMENTS

| CN | 117241396 A | * | 12/2023 | ............ H04W 72/25 |
| CN | 117545042 A | * | 2/2024 | .......... H04W 36/033 |

(Continued)

OTHER PUBLICATIONS

Huawei, et al., "UE Aggregation", 3GPP TSG RAN Meeting #92-e, RWS-210451, 3rd Generation Partnership Project, Mobile Competence Centre, 650, Route Des Lucioles, F-06921 Sophia-Antipolis Cedex, France, vol. TSG RAN, No. Electronic Meeting, Jun. 14, 2021-Jun. 18, 2021, Jun. 7, 2021, 3 Pages, XP052026003, The Whole Document.

(Continued)

*Primary Examiner* — Sujoy K Kundu
*Assistant Examiner* — Vladislav Y Agureyev
(74) *Attorney, Agent, or Firm* — Holland & Hart LLP

(57) ABSTRACT

Methods, systems, and devices for wireless communications are described. Generally, the described techniques provide for an on-board unit (OBU) associated with a vehicle to offload traffic to a handheld user equipment (UE) associated with the vehicle. The UE may receive an indication of time-frequency resources to use for transmitting one or more messages on behalf of the OBU, and may transmit the one or more messages to a network entity via the time-frequency resources. In some cases, a status of the OBU may indicate that the OBU is unable to meet requirements for communicating with the network entity, which may trigger the offloading. For example, the OBU may determine to offload the traffic based on identifying the status. Additionally, or alternatively, the network entity may indicate that the OBU is to offload the traffic after receiving a status report from the OBU.

30 Claims, 16 Drawing Sheets

(58) Field of Classification Search
CPC ..... H04W 72/20; H04W 76/14; H04W 92/18;
H04W 40/22
See application file for complete search history.

(56) References Cited

U.S. PATENT DOCUMENTS

| | | | | |
|---|---|---|---|---|
| 2017/0026885 | A1 | 1/2017 | Panigrahi et al. | |
| 2018/0176845 | A1* | 6/2018 | Visuri | H04W 36/22 |
| 2018/0255531 | A1* | 9/2018 | Xu | H04W 72/20 |
| 2019/0174344 | A1* | 6/2019 | Karella | H04W 24/10 |
| 2019/0182701 | A1* | 6/2019 | Yi | H04L 41/5025 |
| 2019/0364492 | A1* | 11/2019 | Azizi | H04W 52/0264 |
| 2021/0029516 | A1 | 1/2021 | Wang et al. | |
| 2021/0058752 | A1* | 2/2021 | Szilágyi | H04L 69/22 |
| 2021/0058992 | A1* | 2/2021 | Szilágyi | H04W 4/40 |
| 2021/0105152 | A1* | 4/2021 | Padinhakara | H04L 67/12 |
| 2021/0105862 | A1* | 4/2021 | He | H04W 12/037 |
| 2021/0250825 | A1* | 8/2021 | Purkayastha | H04W 36/06 |
| 2022/0015018 | A1* | 1/2022 | Kim | H04W 48/16 |
| 2022/0094597 | A1* | 3/2022 | Ha | H04L 43/0876 |
| 2022/0322230 | A1 | 10/2022 | Ye et al. | |
| 2022/0394620 | A1* | 12/2022 | Hu | H04W 36/00698 |
| 2023/0038999 | A1* | 2/2023 | Wang | H04W 72/23 |
| 2023/0142957 | A1* | 5/2023 | Paladugu | H04W 28/0226 |
| | | | | 370/329 |
| 2024/0196272 | A1* | 6/2024 | Bruhn | H04W 28/0236 |

| | | | | |
|---|---|---|---|---|
| 2024/0334229 | A1* | 10/2024 | Sen | H04W 36/0079 |
| 2024/0334248 | A1* | 10/2024 | Barac | H04W 28/0862 |
| 2024/0414743 | A1* | 12/2024 | Selvanesan | H04W 76/14 |
| 2025/0097966 | A1* | 3/2025 | Pan | H04W 72/40 |
| 2025/0184773 | A1* | 6/2025 | Pan | H04W 76/20 |
| 2025/0220397 | A1* | 7/2025 | Li | H04W 40/22 |
| 2025/0227508 | A1* | 7/2025 | Pan | H04W 24/02 |
| 2025/0227575 | A1* | 7/2025 | Pan | H04W 84/047 |
| 2025/0234425 | A1* | 7/2025 | Kang | H04W 4/40 |
| 2025/0280281 | A1* | 9/2025 | Moritomo | H04W 8/00 |
| 2025/0301287 | A1* | 9/2025 | Yang | H04W 72/02 |
| 2025/0301376 | A1* | 9/2025 | Liu | H04W 36/0072 |
| 2025/0338097 | A1* | 10/2025 | Ochiai | H04B 7/26 |
| 2025/0392948 | A1* | 12/2025 | Xu | H04W 28/0268 |

FOREIGN PATENT DOCUMENTS

| | | | | | |
|---|---|---|---|---|---|
| EP | | 3157290 | A1 * | 4/2017 | H04W 36/12 |
| EP | | 3025553 | B1 * | 9/2020 | H01Q 1/243 |
| EP | | 3783932 | A1 * | 2/2021 | H04L 67/63 |
| EP | | 4327480 | B1 * | 12/2025 | H04B 7/15507 |
| WO | WO-2017176329 | A1 * | 10/2017 | | H04W 28/082 |

OTHER PUBLICATIONS

International Search Report and Written Opinion—PCT/US2024/
019192—ISA/EPO—Jul. 1, 2024.

* cited by examiner

610

620

615

605

600

130    105    115

Network
Entity

Transceiver    Antenna 1310    1315

Communications
Manager

Memory

Code

1330

1320    1325

1340

Processor

1335

1305

1300

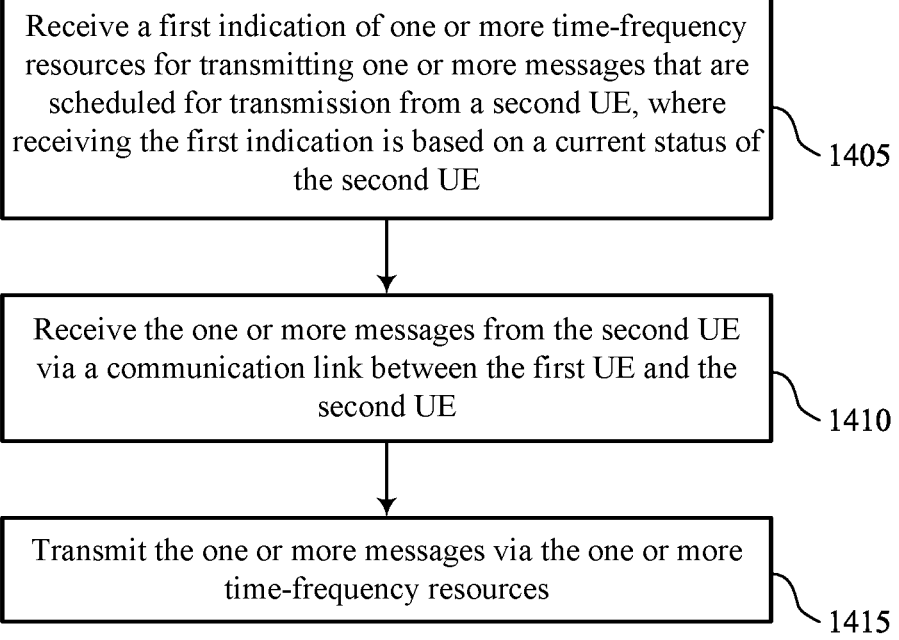

Receive a first indication of one or more time-frequency resources for transmitting one or more messages that are scheduled for transmission from a second UE, where receiving the first indication is based on a current status of the second UE
1405

Receive the one or more messages from the second UE via a communication link between the first UE and the second UE
1410

Transmit the one or more messages via the one or more time-frequency resources
1415

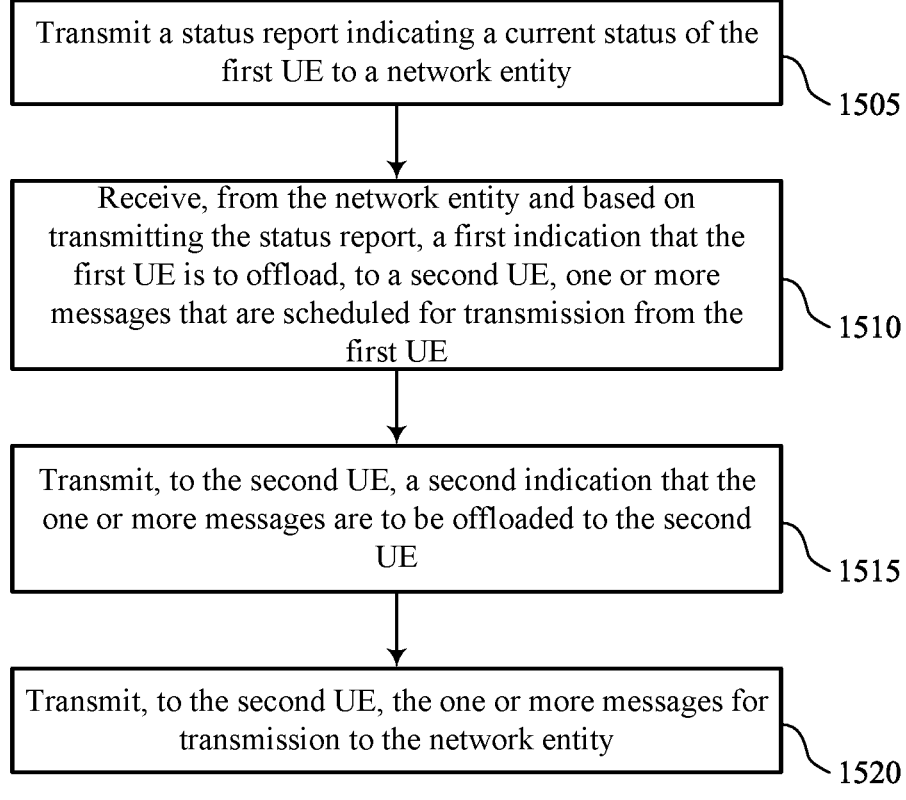

Transmit a status report indicating a current status of the first UE to a network entity

1505

Receive, from the network entity and based on transmitting the status report, a first indication that the first UE is to offload, to a second UE, one or more messages that are scheduled for transmission from the first UE

1510

Transmit, to the second UE, a second indication that the one or more messages are to be offloaded to the second UE

1515

Transmit, to the second UE, the one or more messages for transmission to the network entity

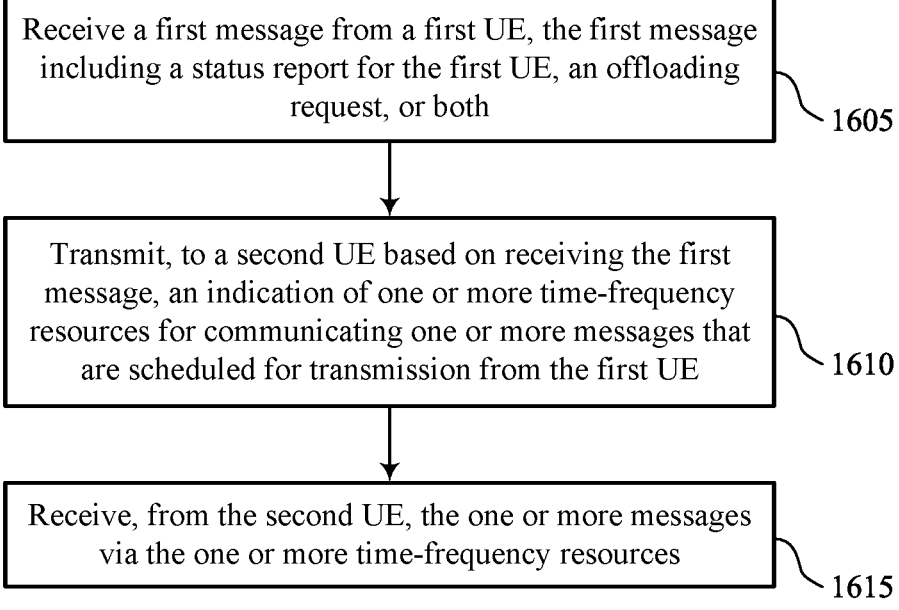

Receive a first message from a first UE, the first message including a status report for the first UE, an offloading request, or both

1605

Transmit, to a second UE based on receiving the first message, an indication of one or more time-frequency resources for communicating one or more messages that are scheduled for transmission from the first UE

1610

Receive, from the second UE, the one or more messages via the one or more time-frequency resources

THERMAL-BASED UE AGGREGATION FOR VEHICULAR COMMUNICATION

FIELD OF TECHNOLOGY

The following relates to wireless communications, including thermal-based user equipment (UE) aggregation for vehicular communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Increasingly, vehicular systems include capabilities for communication with other vehicles, base stations, or other devices in the surroundings. For example, a vehicle may include an on-board unit (OBU) to support safety services, sensor sharing services, cloud services, location services, and the like. However, vehicle OBUs may operate in harsh environments, which may result in degraded performance of the OBU. Thus, maintaining a high quality of service (QOS) for vehicle OBUs may present challenges.

SUMMARY

The described techniques relate to improved methods, systems, devices, and apparatuses that support thermal-based user equipment (UE) aggregation for vehicular communication. For example, the described techniques provide for an on-board unit (OBU) associated with a vehicle to offload traffic to a handheld UE associated with the vehicle. The UE may receive an indication of time-frequency resources to use for transmitting one or more messages on behalf of the OBU, and may transmit the one or more messages to a network entity via the time-frequency resources. In some cases, a status of the OBU (e.g., a current temperature) may indicate that the OBU is unable to meet requirements for communicating with the network entity, which may trigger the offloading. For example, the OBU may determine to offload the traffic based on identifying the status. Additionally, or alternatively, the network entity may indicate that the OBU is to offload the traffic after receiving a status report from the OBU.

A method for wireless communication at a first UE is described. The method may include receiving a first indication of one or more time-frequency resources for transmitting one or more messages that are scheduled for transmission from a second UE, where receiving the first indication is based on a current status of the second UE, receiving the one or more messages from the second UE via a communication link between the first UE and the second UE, and transmitting the one or more messages via the one or more time-frequency resources.

An apparatus for wireless communication at a first UE is described. The apparatus may include a processor, memory coupled with the processor, and instructions stored in the memory. The instructions may be executable by the processor to cause the apparatus to receive a first indication of one or more time-frequency resources for transmitting one or more messages that are scheduled for transmission from a second UE, where receiving the first indication is based on a current status of the second UE, receive the one or more messages from the second UE via a communication link between the first UE and the second UE, and transmit the one or more messages via the one or more time-frequency resources.

Another apparatus for wireless communication at a first UE is described. The apparatus may include means for receiving a first indication of one or more time-frequency resources for transmitting one or more messages that are scheduled for transmission from a second UE, where receiving the first indication is based on a current status of the second UE, means for receiving the one or more messages from the second UE via a communication link between the first UE and the second UE, and means for transmitting the one or more messages via the one or more time-frequency resources.

A non-transitory computer-readable medium storing code for wireless communication at a first UE is described. The code may include instructions executable by a processor to receive a first indication of one or more time-frequency resources for transmitting one or more messages that are scheduled for transmission from a second UE, where receiving the first indication is based on a current status of the second UE, receive the one or more messages from the second UE via a communication link between the first UE and the second UE, and transmit the one or more messages via the one or more time-frequency resources.

Some examples of the method, apparatuses, and non-transitory computer-readable medium described herein may further include operations, features, means, or instructions for receiving a first message including an offloading request and transmitting, in response to the first message, a second message including an acceptance of the offloading request.

In some examples of the method, apparatuses, and non-transitory computer-readable medium described herein, the first message may be received from the second UE; and the first indication may be received from the second UE based on the first message being received from the second UE.

In some examples of the method, apparatuses, and non-transitory computer-readable medium described herein, the first message may be received from a network entity; and the first indication may be received from the network entity in a resource grant based on the first message being received from the network entity.

In some examples of the method, apparatuses, and non-transitory computer-readable medium described herein, the communication link between the first UE and the second UE includes a sidelink communication link, a cabled connection, an unlicensed spectrum communication link, or any combination thereof.

In some examples of the method, apparatuses, and non-transitory computer-readable medium described herein, the one or more messages include an application layer message, an internet protocol (IP) packet, a transport block (TB), a set of one or more modulation symbols, a frequency domain signal, a time domain signal, or any combination thereof.

In some examples of the method, apparatuses, and non-transitory computer-readable medium described herein, the first indication further includes a frame number, a slot number, symbol mapping information, or any combination thereof.

In some examples of the method, apparatuses, and non-transitory computer-readable medium described herein, the current status of the second UE includes a thermal status of the second UE, a performance metric of the second UE, or both.

Some examples of the method, apparatuses, and non-transitory computer-readable medium described herein may further include operations, features, means, or instructions for transmitting a first message including information associated with the first UE, the information including at least an identifier (ID) of the first UE.

A method for wireless communications at a first UE is described. The method may include transmitting a status report indicating a current status of the first UE to a network entity, receiving, from the network entity and based on transmitting the status report, a first indication that the first UE is to offload, to a second UE, one or more messages that are scheduled for transmission from the first UE, transmitting, to the second UE, a second indication that the one or more messages are to be offloaded to the second UE, and transmitting, to the second UE, the one or more messages for transmission to the network entity.

An apparatus for wireless communications at a first UE is described. The apparatus may include a processor, memory coupled with the processor, and instructions stored in the memory. The instructions may be executable by the processor to cause the apparatus to transmit a status report indicating a current status of the first UE to a network entity, receive, from the network entity and based on transmitting the status report, a first indication that the first UE is to offload, to a second UE, one or more messages that are scheduled for transmission from the first UE, transmit, to the second UE, a second indication that the one or more messages are to be offloaded to the second UE, and transmit, to the second UE, the one or more messages for transmission to the network entity.

Another apparatus for wireless communications at a first UE is described. The apparatus may include means for transmitting a status report indicating a current status of the first UE to a network entity, means for receiving, from the network entity and based on transmitting the status report, a first indication that the first UE is to offload, to a second UE, one or more messages that are scheduled for transmission from the first UE, means for transmitting, to the second UE, a second indication that the one or more messages are to be offloaded to the second UE, and means for transmitting, to the second UE, the one or more messages for transmission to the network entity.

A non-transitory computer-readable medium storing code for wireless communications at a first UE is described. The code may include instructions executable by a processor to transmit a status report indicating a current status of the first UE to a network entity, receive, from the network entity and based on transmitting the status report, a first indication that the first UE is to offload, to a second UE, one or more messages that are scheduled for transmission from the first UE, transmit, to the second UE, a second indication that the one or more messages are to be offloaded to the second UE, and transmit, to the second UE, the one or more messages for transmission to the network entity.

Some examples of the method, apparatuses, and non-transitory computer-readable medium described herein may further include operations, features, means, or instructions for transmitting, to the network entity, a third indication that the one or more messages may be to be offloaded based on a data rate of the one or more messages exceeding a threshold data rate, where receiving the first indication may be based on transmitting the third indication.

In some examples of the method, apparatuses, and non-transitory computer-readable medium described herein, the status report includes a first indication of a thermal status of the first UE, a performance metric of the first UE, a second indication that the first UE may be unable to meet a quality of service (QOS) requirement, or any combination thereof.

In some examples of the method, apparatuses, and non-transitory computer-readable medium described herein, the performance metric of the first UE includes quantity of transmission layers supported by the first UE, a maximum modulation and coding scheme (MCS) order supported by the first UE, a maximum transmission power supported by the first UE, or any combination thereof.

In some examples of the method, apparatuses, and non-transitory computer-readable medium described herein, the one or more messages include an application layer message, an IP packet, a TB, a set of one or more modulation symbols, a frequency domain signal, a time domain signal, or any combination thereof.

Some examples of the method, apparatuses, and non-transitory computer-readable medium described herein may further include operations, features, means, or instructions for transmitting a capability report including one or more capabilities of the second UE, where receiving the first indication may be based on transmitting the capability report.

A method for wireless communication at a network entity is described. The method may include receiving a first message from a first UE, the first message including a status report for the first UE, an offloading request, or both, transmitting, to a second UE based on receiving the first message, an indication of one or more time-frequency resources for communicating one or more messages that are scheduled for transmission from the first UE, and receiving, from the second UE, the one or more messages via the one or more time-frequency resources.

An apparatus for wireless communication at a network entity is described. The apparatus may include a processor, memory coupled with the processor, and instructions stored in the memory. The instructions may be executable by the processor to cause the apparatus to receive a first message from a first UE, the first message including a status report for the first UE, an offloading request, or both, transmit, to a second UE based on receiving the first message, an indication of one or more time-frequency resources for communicating one or more messages that are scheduled for transmission from the first UE, and receive, from the second UE, the one or more messages via the one or more time-frequency resources.

Another apparatus for wireless communication at a network entity is described. The apparatus may include means for receiving a first message from a first UE, the first message including a status report for the first UE, an offloading request, or both, means for transmitting, to a second UE based on receiving the first message, an indication of one or more time-frequency resources for communicating one or more messages that are scheduled for transmission from the first UE, and means for receiving, from the second UE, the one or more messages via the one or more time-frequency resources.

A non-transitory computer-readable medium storing code for wireless communication at a network entity is described. The code may include instructions executable by a processor to receive a first message from a first UE, the first message including a status report for the first UE, an offloading request, or both, transmit, to a second UE based on receiving the first message, an indication of one or more time-frequency resources for communicating one or more messages that are scheduled for transmission from the first UE, and receive, from the second UE, the one or more messages via the one or more time-frequency resources.

Some examples of the method, apparatuses, and non-transitory computer-readable medium described herein may further include operations, features, means, or instructions for transmitting, to the first UE in response to the first message, a second message including a trigger to offload the one or more messages to the second UE based on a determination that a temperature of the first UE satisfies a threshold temperature, a performance metric of the first UE fails to satisfy a QoS requirement, or both, where receiving the one or more messages from the second UE may be based on transmitting the second message.

Some examples of the method, apparatuses, and non-transitory computer-readable medium described herein may further include operations, features, means, or instructions for receiving the first message from the first UE may be based on a temperature of the first UE satisfying a threshold temperature, a block error rate (BLER) of the first UE satisfying a BLER threshold, a data throughput of the first UE failing to satisfy a data throughput threshold, or any combination thereof.

Some examples of the method, apparatuses, and non-transitory computer-readable medium described herein may further include operations, features, means, or instructions for receiving a second message from the first UE, the second message including an ID associated with the second UE, a buffer status report (BSR) associated with the first UE, or both.

Some examples of the method, apparatuses, and non-transitory computer-readable medium described herein may further include operations, features, means, or instructions for selecting the one or more time-frequency resources based on the BSR associated with the first UE, where transmitting the indication of the one or more time-frequency resources may be based on selecting the one or more time-frequency resources.

In some examples of the method, apparatuses, and non-transitory computer-readable medium described herein, the first message may be received from the first UE via a media access control (MAC) control element (MAC-CE).

6

Figure 4:
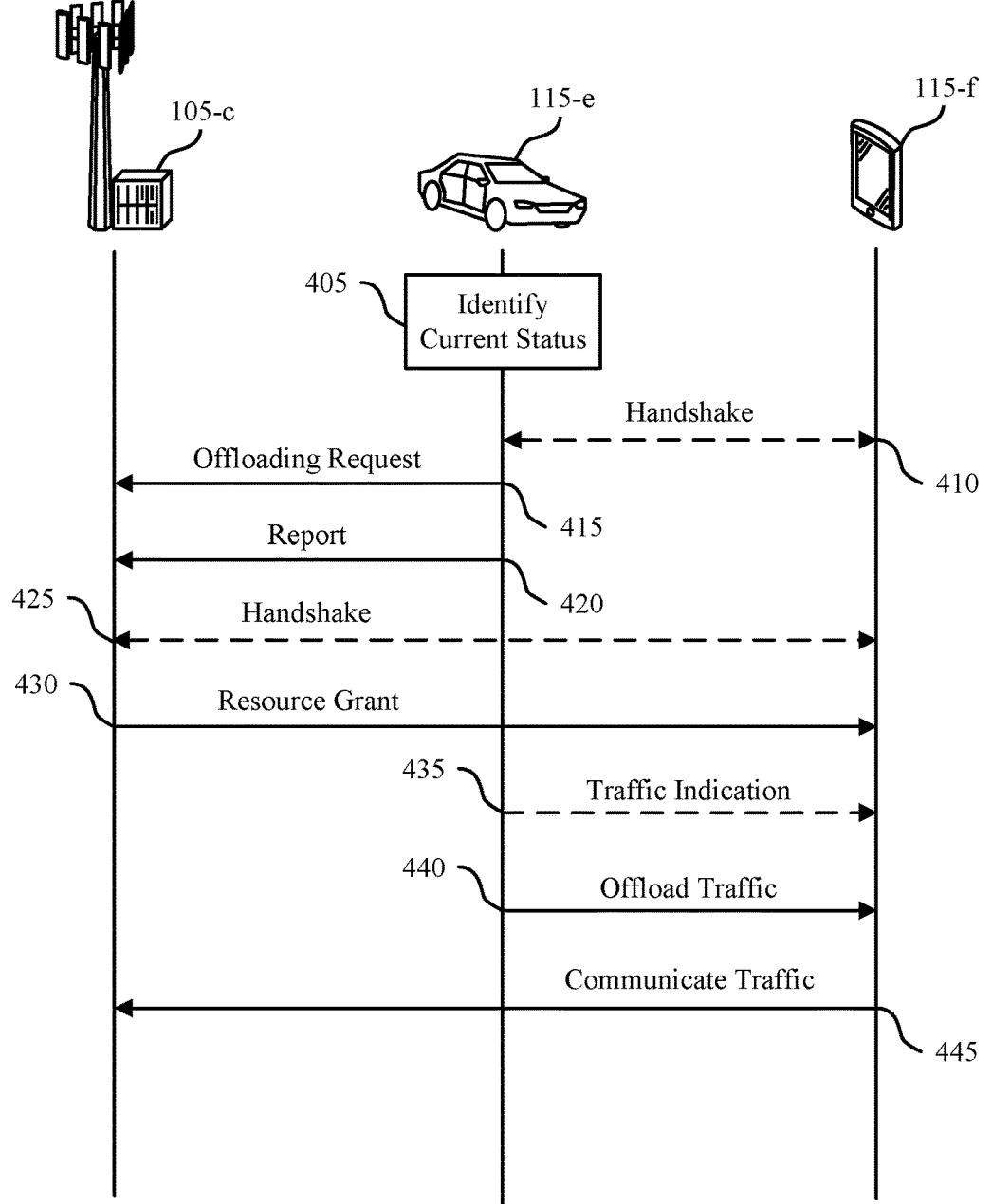

FIG. 4 illustrates an example of a process flow that supports thermal-based UE aggregation for vehicular communication in accordance with one or more aspects of the present disclosure.

Figure 5:
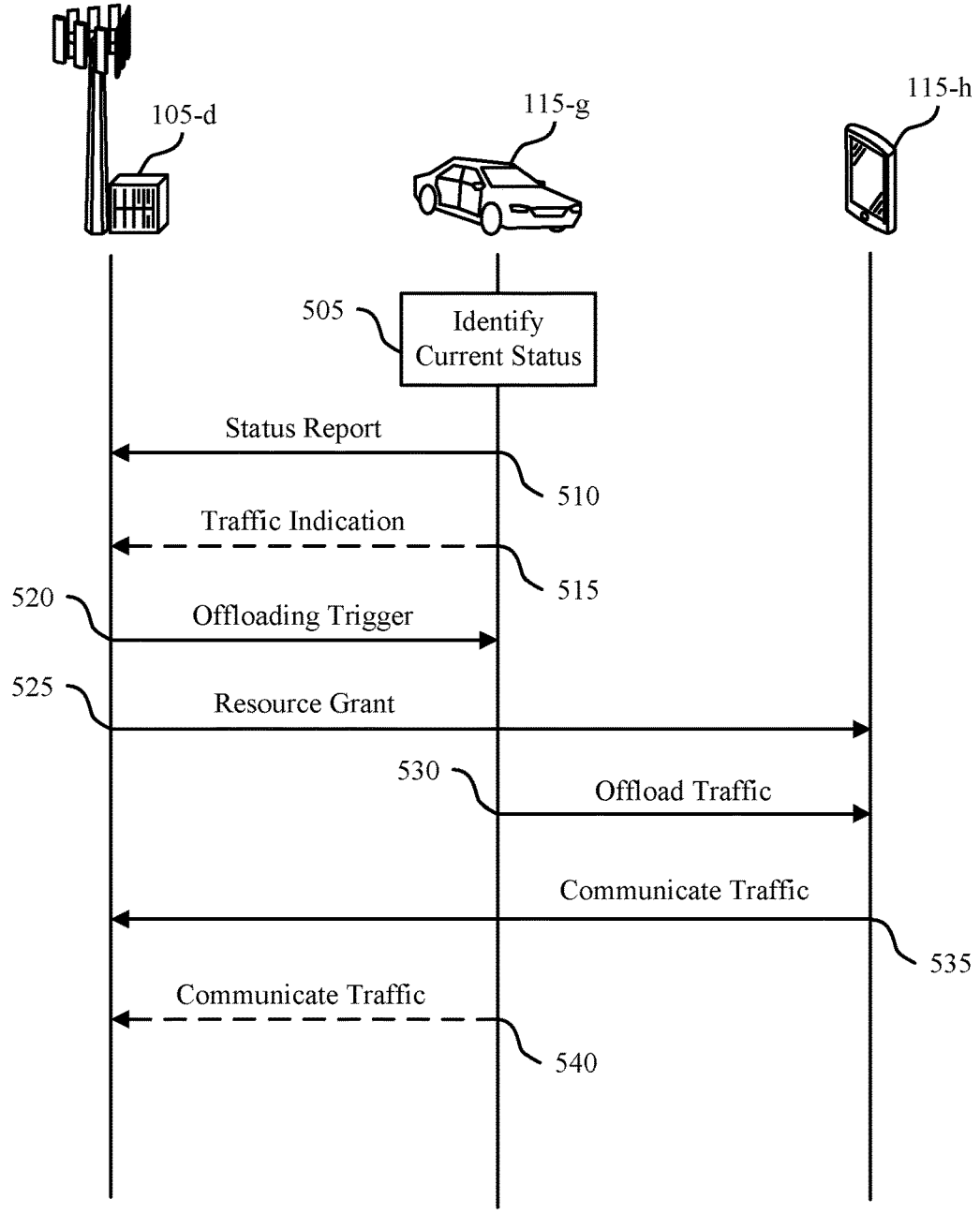

FIG. 5 illustrates an example of a process flow that supports thermal-based UE aggregation for vehicular communication in accordance with one or more aspects of the present disclosure.

Figure 6:
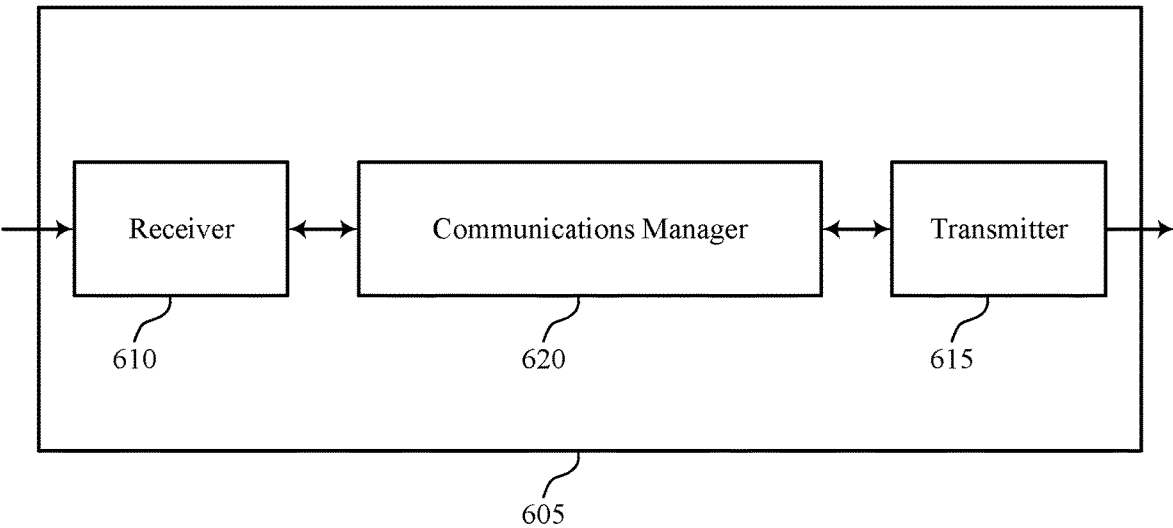
Figure 7:
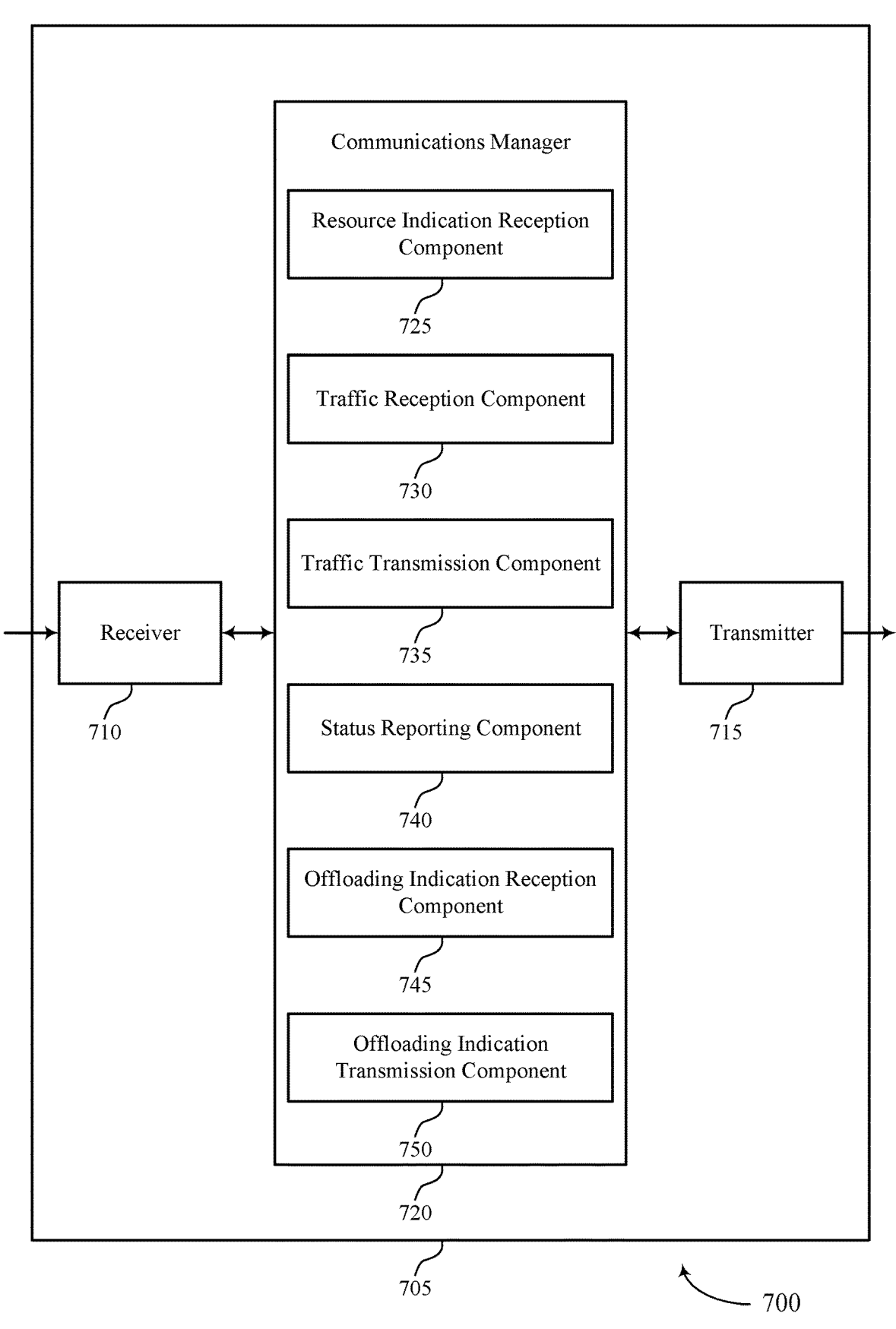

FIGS. 6 and 7 illustrate block diagrams of devices that support thermal-based UE aggregation for vehicular communication in accordance with one or more aspects of the present disclosure.

Figure 8:
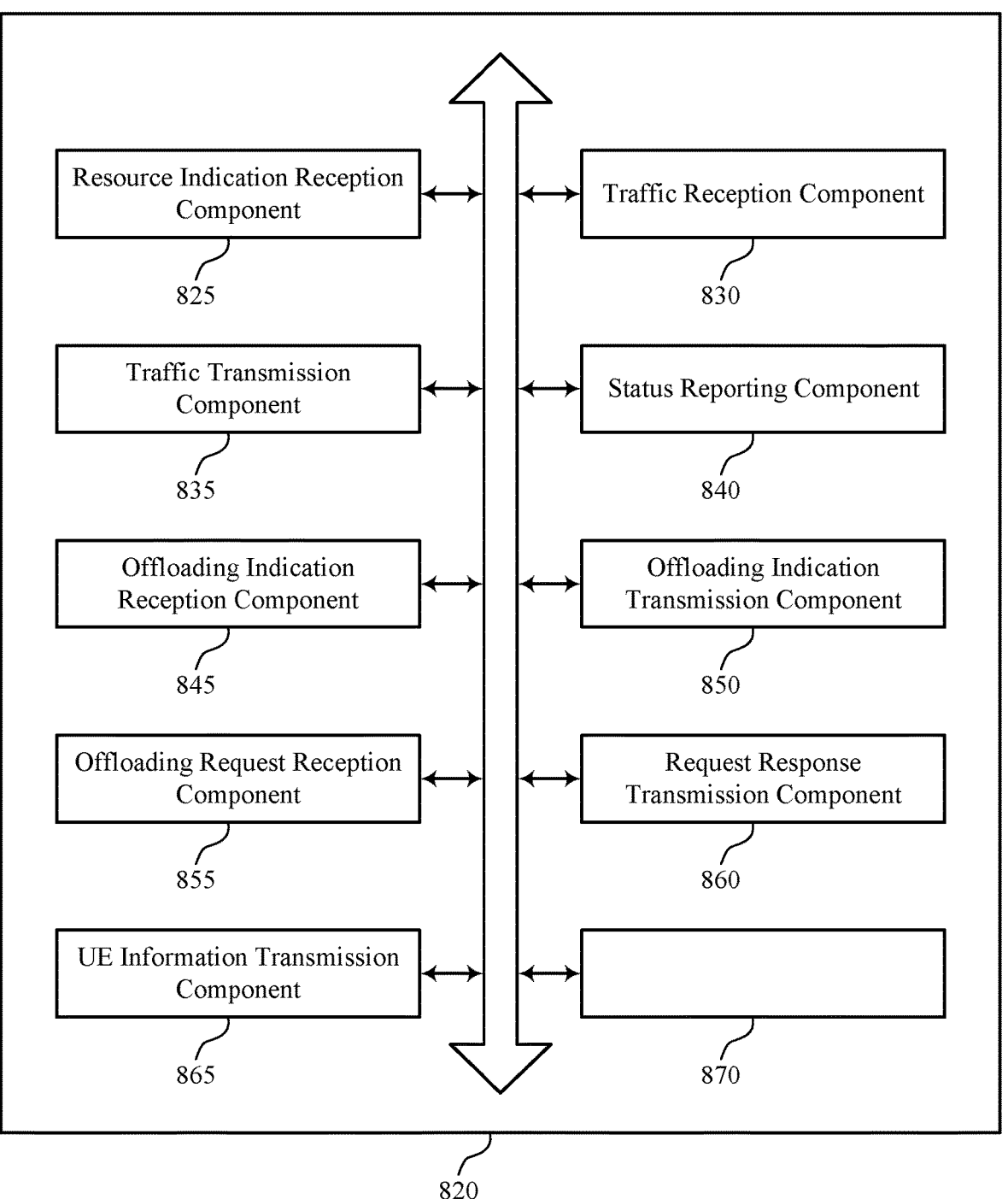

FIG. 8 illustrates a block diagram of a communications manager that supports thermal-based UE aggregation for vehicular communication in accordance with one or more aspects of the present disclosure.

Figure 9:
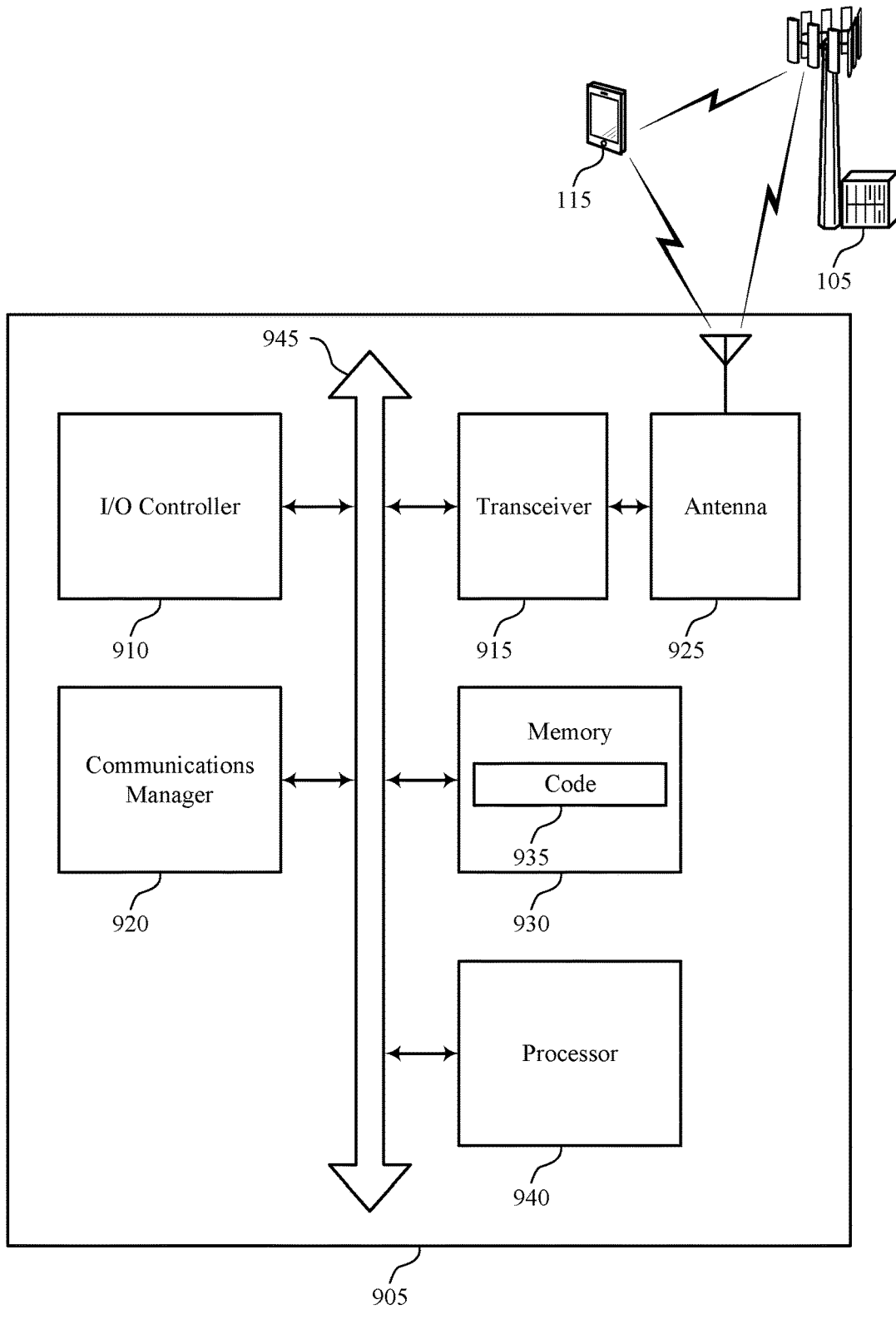

FIG. 9 illustrates a diagram of a system including a device that supports thermal-based UE aggregation for vehicular communication in accordance with one or more aspects of the present disclosure.

Figure 10:
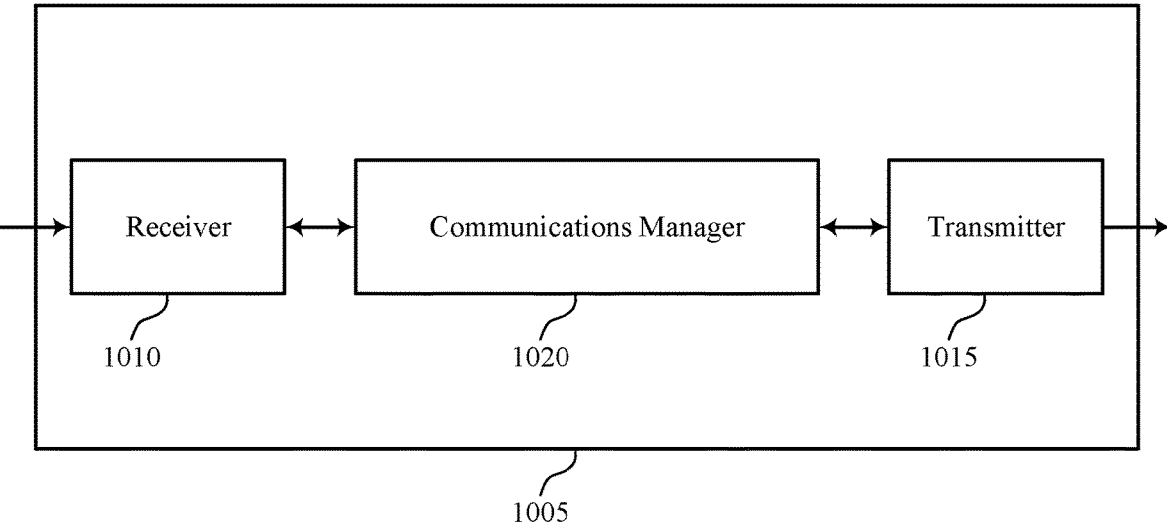
Figure 11:
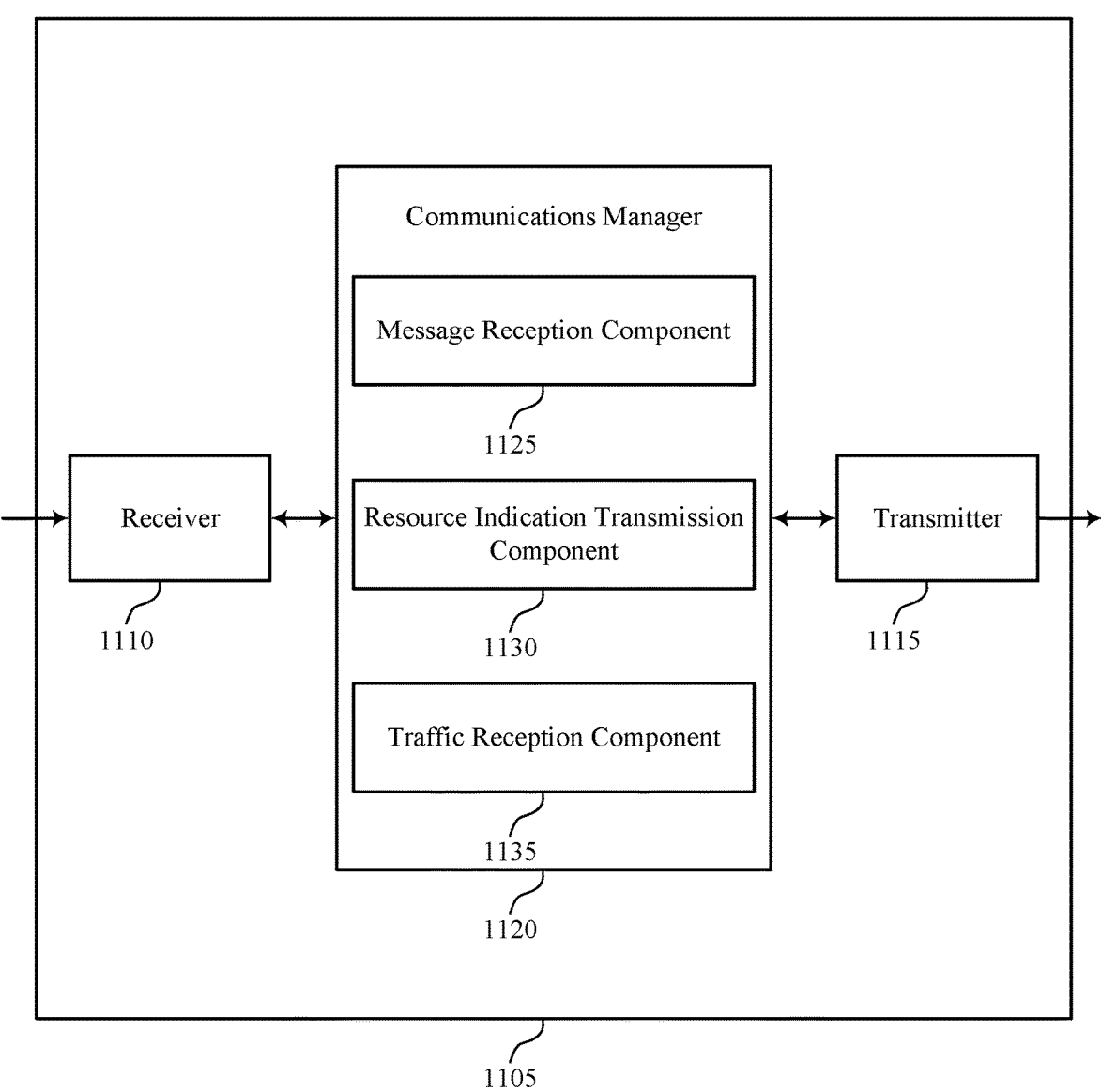

FIGS. 10 and 11 illustrate block diagrams of devices that support thermal-based UE aggregation for vehicular communication in accordance with one or more aspects of the present disclosure.

Figure 12:
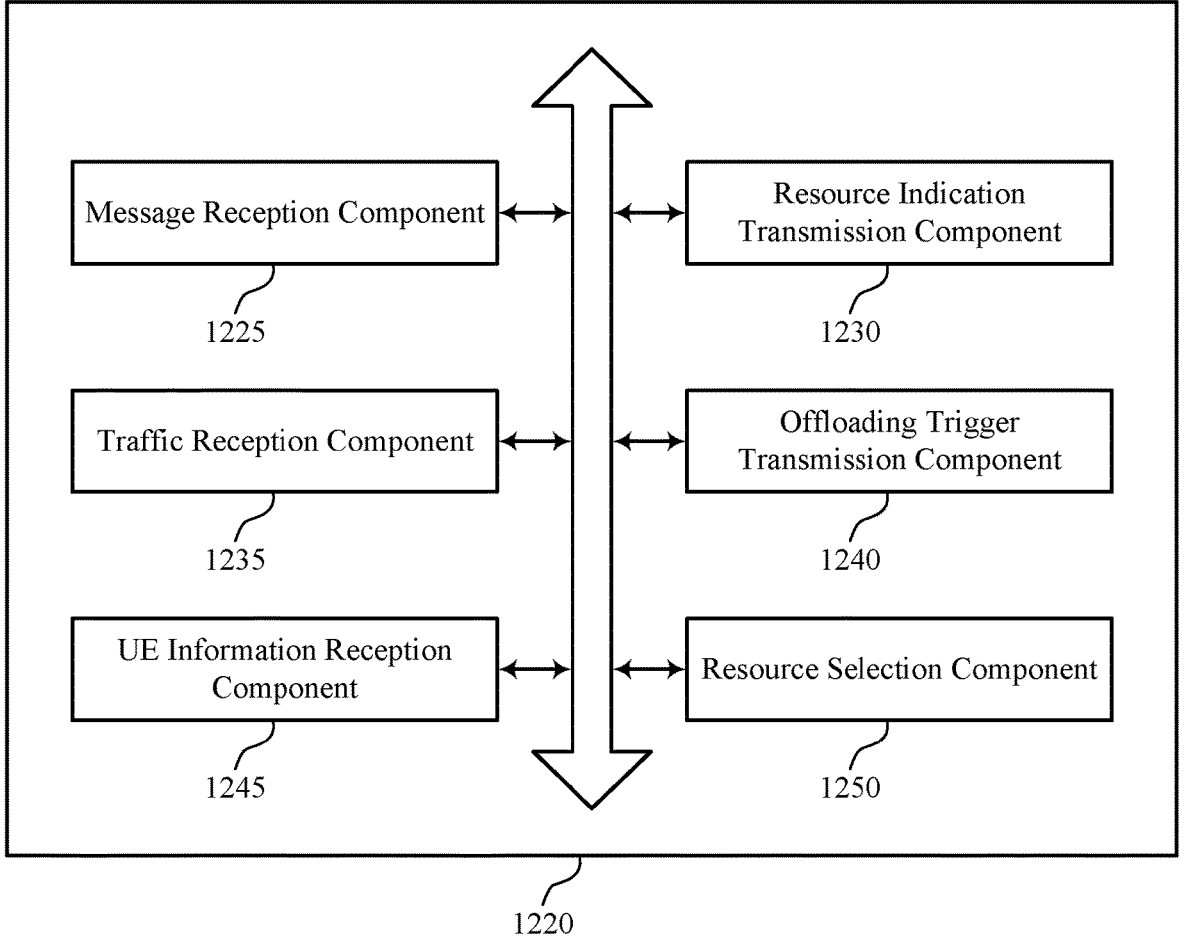

FIG. 12 illustrates a block diagram of a communications manager that supports thermal-based UE aggregation for vehicular communication in accordance with one or more aspects of the present disclosure.

Figure 13:

FIG. 13 illustrates a diagram of a system including a device that supports thermal-based UE aggregation for vehicular communication in accordance with one or more aspects of the present disclosure.

FIGS. 14 through 16 illustrate flowcharts showing methods that support thermal-based UE aggregation for vehicular communication in accordance with one or more aspects of the present disclosure.

DETAILED DESCRIPTION

Vehicular systems may include capabilities for communication with other vehicles, base stations, or other devices in the surroundings. For example, a vehicle may include an on-board unit (OBU) to support safety services, sensor sharing services, cloud services, location services, and the like. The OBU may communicate with a network entity of a wireless communications system (e.g., the OBU may operate as a user equipment (UE) of the wireless communications system). In some cases, the network entity may communicate with other UEs associated with the vehicle (e.g., a handheld UE that is paired with the OBU). In some examples, a thermal status of the OBU may be associated with a communication capability of the OBU to satisfy one or more criteria. For example, communications performed by the OBU may be associated with various requirements, such as data rate requirements, reliability requirements, latency requirements, or the like. In some cases, such as when the OBU experiences relatively high temperatures, the communication capability of the OBU may fail to satisfy one or more criteria for transmitting scheduled traffic to the network entity. For example, a data rate supported by the OBU may be limited based on the temperature of the OBU exceeding a threshold temperature, which may reduce communication quality between the network entity and the OBU.

In some cases, the OBU may offload one or more messages that are scheduled for the OBU to an associated UE. For example, the UE may receive an indication of time-frequency resources to use for transmitting the one or more messages, and may transmit the one or more messages to the network entity via the time-frequency resources (e.g., on behalf of the OBU). In some examples, the OBU may trigger the offloading based on identifying a thermal status of the OBU (e.g., measured with internal sensors). For example, the OBU may transmit an offloading request to the UE, or may directly transmit the traffic to the UE, upon measuring an internal temperature which exceeds a threshold temperature. Additionally, or alternatively, the network entity may trigger the offloading based on receiving a status report from the OBU.

Aspects of the disclosure are initially described in the context of wireless communications systems. Aspects of the disclosure are further illustrated by and described with reference to a wireless communications system and process flows. Aspects of the disclosure are further illustrated by and described with reference to apparatus diagrams, system diagrams, and flowcharts that relate to thermal-based UE aggregation for vehicular communication.

Figure 1:
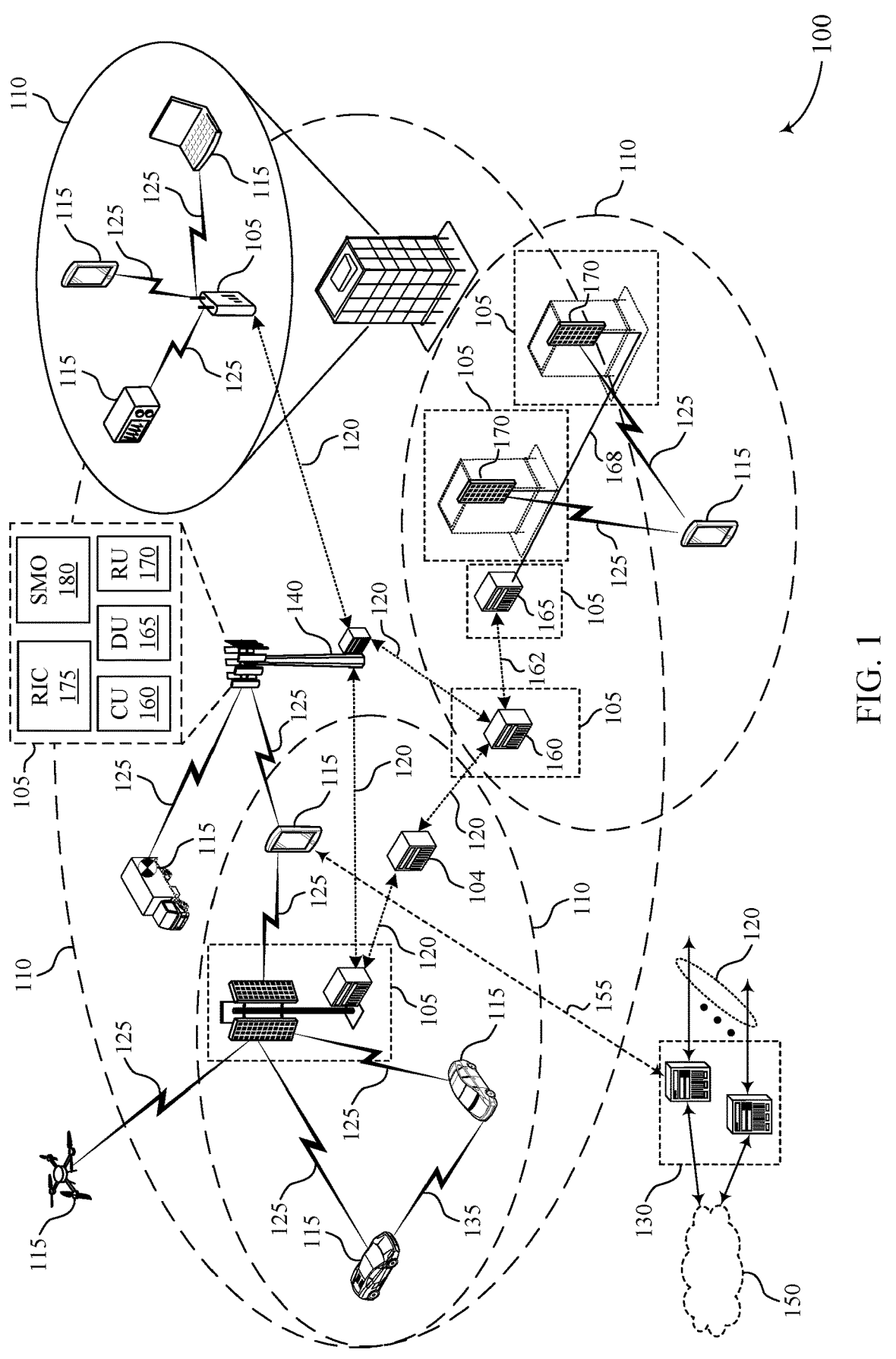
FIG. 1 illustrates an example of a wireless communications system that supports thermal-based user equipment (UE) aggregation for vehicular communication in accordance with one or more aspects of the present disclosure.

FIG. 1 illustrates an example of a wireless communications system 100 that supports thermal-based UE aggregation for vehicular communication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support thermal-based UE aggregation for vehicular communication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some wireless communications systems, such as the wireless communications system 100, an on-board unit (OBU) associated with a vehicle may offload traffic to a handheld UE 115 associated with the vehicle. The UE 115 may receive an indication of time-frequency resources to use for transmitting one or more messages on behalf of the OBU, and may transmit the one or more messages to a network entity 105 via the time-frequency resources (e.g., via a communication link 125). In some cases, a status of the OBU (e.g., a current temperature) may indicate that the OBU is unable to meet requirements for communicating with the network entity 105, which may trigger the offloading. For example, the OBU may determine to offload the traffic based on identifying the status. Additionally, or alternatively, the network entity 105 may indicate that the OBU is to offload the traffic after receiving a status report from the OBU.

Figure 2:
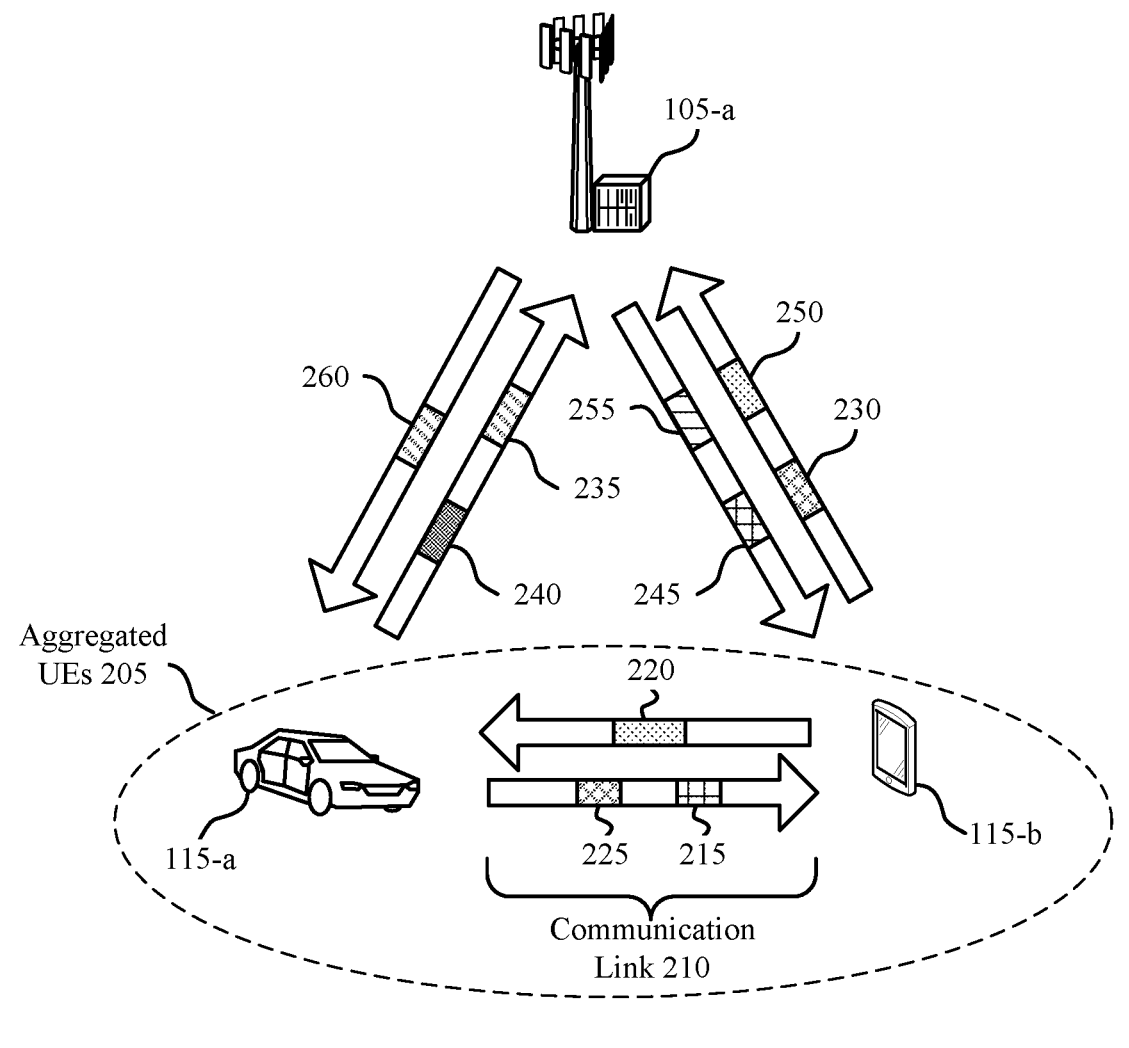
FIG. 2 illustrates an example of a wireless communications system that supports thermal-based UE aggregation for vehicular communication in accordance with one or more aspects of the present disclosure.
Figure 2:
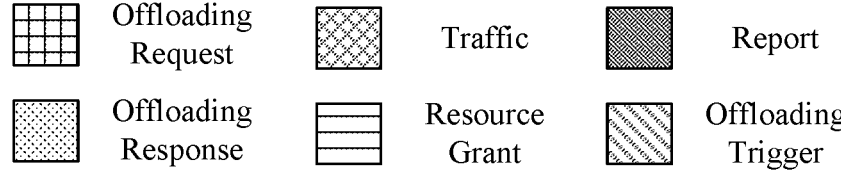

FIG. 2 illustrates an example of a wireless communications system 200 that supports thermal-based UE aggregation for vehicular communication in accordance with one or more aspects of the present disclosure. The wireless communications system 200 may include one or more aspects of the wireless communications system 100. For example, the wireless communications system 200 may include a network entity 105-*a*, which may be an example of a network entity 105 described with reference to FIG. 1. Additionally, the wireless communications system 200 may include a UE 115-*a*, which may be an example of a vehicle OBU, and a UE 115-*b*, which may be an example of a UE 115 described with reference to FIG. 1. UE 115-*b* may, for example, be included in a handheld device of a driver operating the vehicle and may be paired (e.g., via a wired or wireless connection) with the vehicle.

In some cases, the UE 115-*a* may support wireless communications between a vehicle and its surroundings in a V2X framework. For example, the UE 115-*a* may facilitate V2V communications (e.g., OBU to OBU), vehicle to pedestrian (V2P) communications (e.g., OBU to handheld device), vehicle to road infrastructure (V2I) communications (e.g., OBU to road-side unit (RSU)), vehicle to network (V2N) communications (e.g., OBU to network entity), or any combination thereof. In some cases, various services supported by the UE 115-*a* may correspond to various communication constraints, such as data rate constraints, latency constraints, quality-of-service (QOS) constraints, reliability constraints, or any combination thereof. For instance, safety related services, such as communicating basic safety messages (BSM) between vehicles, may be associated with relatively lower data rate constraints and may be associated with relatively higher reliability and latency constraints. As another example, sensor sharing services (e.g., sharing sensor data between vehicles) may be associated with relatively higher data rate constraints, and vehicle-to-cloud services (e.g., V2N communications) may be associated with varying data rate constraints (e.g., depending on the application). In some cases, some V2X services may have a greater delay tolerance, such as communicating a high-definition (HD) map update via V2I.

In some examples, a thermal condition of the UE 115-*a* may impact a performance of the UE 115-*a*. For example, the UE 115-*a* may experience a decrease in communication capability as a temperature of the UE 115-*a* increases (e.g., a data rate supported by the UE 115-*a* may be inversely correlated with temperature). In some cases, such as when the UE 115-*a* is exposed to sunlight (e.g., is located in a shark-fin antenna on top of a vehicle), the UE 115-*a* may reach an extreme temperature (e.g., greater than 80° C.), which may compromise the communication performance of the UE 115-*a*. For instance, the UE 115-*a* may be unable to fulfill QoS constraints, and transmission of one or more packets to the network entity 105-*a* may be delayed or dropped (e.g., packets with a relatively high data rate).

In some cases, the UE 115-*a* may be aggregated with another UE 115 (e.g., the UE 115-*b*) to form aggregated UEs 205, which may support enhanced service for the UE 115-*a* (e.g., an OBU of a vehicle) and the UE 115-*b* (e.g., a handheld device of a driver of the vehicle). For example, sensor information obtained by the UE 115-*a* may support improved communication performance for the UE 115-*b* (e.g., enhanced beam management) and positioning information obtained by the UE 115-*b* may support improved positioning performance for the UE 115-*a*. The aggregated UEs 205 may be paired or associated with one another via a communication link 210. For example, the communication link 210 may be an example of a sidelink communications link. Additionally, or alternatively, the communication link 210 may be an example of an unlicensed spectrum link (e.g., a Wi-Fi link or a Bluetooth link), or may be an example of a cabled connection (e.g., a universal serial bus (USB) interface).

To support satisfying communication constraints when the UE 115-*a* experiences extreme temperatures, the UE 115-*a* may offload one or more scheduled communications (e.g., traffic to be transmitted by the UE 115-*a*) to the UE 115-*b*. In some examples, the offloading may be triggered according to a thermal status of the UE 115-*a*. For example, the UE 115-*a* may measure and determine its current temperature via one or more internal sensors of the UE 115-*a*. In some cases, the UE 115-*a* may trigger the offloading upon identifying that the temperature of the UE 115-*a* has exceeded a threshold temperature. Such offloading may be transparent to the network entity 105-*a* (e.g., the network entity 105-*a* is unaware of the ongoing offloading) or may be non-transparent to the network entity 105-*a* (e.g., the network entity 105-*a* is aware of the ongoing offloading). Additionally, or alternatively, the UE 115-*a* may transmit a status report to the network entity 105-*a* and the network entity 105-*a* may trigger the offloading based on identifying that the UE 115-*a* is unable to satisfy one or more communication constraints (e.g., based on a thermal status of the UE 115-*a*, a performance metric of the UE 115-*a*, a direct indication that the UE 115-*a* is unable to meet a QoS constraint, or any combination thereof).

In a first example, the UE 115-*a* may trigger the offloading such that the network entity 105-*a* is unaware of the ongoing offloading (e.g., transparent to the network entity 105-*a*). The UE 115-*a* may perform measurements using sensors in order to determine a current thermal status of the UE 115-a. For example, the UE 115-a may determine that its temperature exceeds a temperature threshold (e.g., a preconfigured threshold) and may trigger traffic offloading according to the determination. In some cases, the measurement may be performed via internal and external thermal sensors which identify a temperature of a modem or system-on-chip (SoC) of the UE 115-a, an environmental temperature (e.g., an air temperature or a temperature of a medium that is in direct contact with the UE 115-a), or both.

In some examples, the UE 115-a and the UE 115-b may perform a handshake operation as part of the offloading procedure. For example, the UE 115-a may transmit an offloading request 215 to the UE 115-b. The UE 115-b may transmit an offloading response 220 to the UE 115-a in response to the offloading request 215, which may indicate an acceptance of the offloading request 215 or a rejection of the offloading request 215. In some cases, the UE 115-b may transmit information associated with the UE 115-b, such as an identifier (ID) of the UE 115-b, to the UE 115-a. In some cases, such as when the offloading response 220 includes an acceptance of the offloading request 215, the UE 115-a may determine to perform offloading and may transmit traffic 225 to the UE 115-b. Additionally, or alternatively, the UE 115-a may directly transmit the traffic 225 to the UE 115-b upon triggering the offloading procedure (e.g., without performing the handshake operation).

The traffic 225 may include one or more messages that are scheduled for transmission to the network entity 105-a from the UE 115-a. For example, the traffic 225 may be an example of an application layer message, an IP packet, a transport block (TB), a collection of modulation symbols, a frequency domain signal (e.g., a pre-inverse fast Fourier transform (IFFT) signal), a time domain signal (a post-IFFT signal), or any combination thereof. In some cases, the UE 115-a may transmit additional information to the UE 115-b with the traffic 225. For example, when the traffic 225 includes a frequency domain signal, a time domain signal, or both, the UE 115-a may indicate, to the UE 115-b, one or more time-frequency resources (e.g., a frame number, a slot number, or both) for transmission of the traffic 225. As another example, such as when the traffic 225 includes a collection of modulation symbols, the UE 115-a may indicate, to the UE 115-b, resource allocation information for mapping the modulation symbols (e.g., to support the UE 115-b correctly generating the signal for transmission). In some cases, the UE 115-b may transmit traffic 230 to the network entity 105-b, which may be the traffic 225 transmitted on behalf of the UE 115-a.

In a second example, the UE 115-a may trigger the offloading such that the network entity 105-a is aware of the ongoing offloading (e.g., non-transparent to the network entity 105-a). For example, the UE 115-a may identify that its current temperature exceeds a temperature threshold (e.g., via internal sensors, external sensors, or both), and may trigger the offloading. Additionally, or alternatively, the UE 115-a may identify that its performance has degraded (e.g., a worsening block error rate (BLER), a decreasing throughput, or the like), and may trigger the offloading.

In some cases, the UE 115-a may transmit an offloading request 235 to the network entity 105-a after determining to trigger the offloading. In some cases, the offloading request 235 may include information associated with the UE 115-b, such as an ID of the UE 115-b (e.g., a radio network temporary identifier (RNTI)). The offloading request 235 may be transmitted via a MAC control element (MAC-CE). Based on receiving the offloading request, the network entity 105-a may schedule transmissions of the UE 115-b (e.g., uplink transmissions, sidelink transmissions, or both) for communicating traffic scheduled for the UE 115-a. In some cases, the scheduling of the UE 115-b may be based on information signaled by the UE 115-a. For example, the network entity 105-a may receive a report 240 from the UE 115-a, which may include a buffer status report (BSR) (e.g., a buffer size of the UE 115-a). The network entity 105-a may identify the traffic to be offloaded according to the BSR, and the network entity 105-a may allocate one or more time-frequency resources to the UE 115-b based on the BSR.

In some cases, the UE 115-b may transmit the traffic 230 to the network entity 105-a after receiving one or more messages from the network entity 105-a, the UE 115-a, or both. For example, the network entity 105-a may transmit a resource grant 255 to the UE 115-b, which may indicate the one or more time-frequency resources for transmitting offloaded traffic, and the UE 115-a may transmit the traffic 225 to the UE 115-b to indicate the one or more messages to be offloaded. Additionally, or alternatively, the UE 115-b may perform a handshake operation with the network entity 105-a, the UE 115-a, or both prior to receiving the resource grant 255 and the traffic 225. In one example, the UE 115-a and the UE 115-b may perform the handshake operation via the offloading request 215 and the offloading response 220. In such an example, the UE 115-a may refrain from transmitting the offloading request 235 to the network entity 105-a until receiving an acceptance of the offloading request 215 from the UE 115-b. In another example, the UE 115-b and the network entity 105-a may perform the handshake operation via an offloading request 245 and an offloading response 250. In such an example, the network entity 105-a may transmit the offloading request 245 to the UE 115-b after receiving the offloading request 235 from the UE 115-a. In some cases, such as when the offloading is triggered by the UE 115-a, the cause of the offloading (e.g., a thermal status of the UE 115-a) may be unknown to the network entity 105-a.

In a third example, the network entity 105-a may determine to trigger the offloading based on signaling received from the UE 115-a. In some cases, the UE 115-a may transmit the report 240 to the network entity 105-a (e.g., as part of normal operations), which may include a thermal status of the UE 115-a, a performance metric of the UE 115-a, and indication of a QoS capability of the UE 115-a, or any combination thereof. For example, the UE 115-a may measure a current temperature of the UE 115-a (e.g., via internal sensors, external sensors, or both) and may report the temperature to the network entity 105-a via the report 240. Additionally, or alternatively, the UE 115-a may report a performance metric of the UE 115-a, which may be impacted by the thermal status of the UE 115-a. For example, the performance metric may indicate an ability of the UE 115-a to perform multi-layer transmissions (e.g., a quantity of transmission layers supported), a maximum modulation order supported by the UE 115-a, a maximum modulation and coding scheme (MCS) index supported by the UE 115-a, a maximum transmission power supported by the UE 115-a, an indication of degraded performance of the UE 115-a, or any combination thereof. In some examples, the UE 115-a may transmit, to the network entity 105-a via the report 240, an indication that the UE 115-a is unable to satisfy one or more communication criteria, such as a QoS constraint, due to a thermal status of the UE 115-a.

In some examples, the network entity 105-a may initiate the offloading procedure based on receiving the report 240. For example, the network entity 105-a may transmit an offloading trigger 260 to the UE 115-*a* after determining that the UE 115-*a* has a thermal issue or is otherwise unable to satisfy one or more communication criteria (e.g., based on the report 240). In some cases, the network entity 105-*a* may be aware of the association between the aggregated UEs 205, which may be reported by the UE 115-*a*, the UE 115-*b*, or both. The UE 115-*a* may transmit the traffic 225 to the UE 115-*b* based on receiving the offloading trigger 260, and the network entity 105-*a* may transmit the resource grant 255 to the UE 115-*b* (e.g., to schedule the offloaded traffic).

In some cases, the UE 115-*a* may refrain from offloading at least a portion of the traffic. For example, the UE 115-*a* may be able to perform relatively low data rate transmissions (e.g., despite having thermal issues), such as a BSM, and may not offload such transmissions by default. In some cases, the UE 115-*a* may transmit an indication (e.g., an explicit indication) to the network entity 105-*a* of what traffic is to be offloaded and what traffic is not to be offloaded. For example, the UE 115-*a* may transmit one or more IP addresses, logical channel IDs, or both to indicate the traffic to the network entity 105-*a*.

Figure 3:
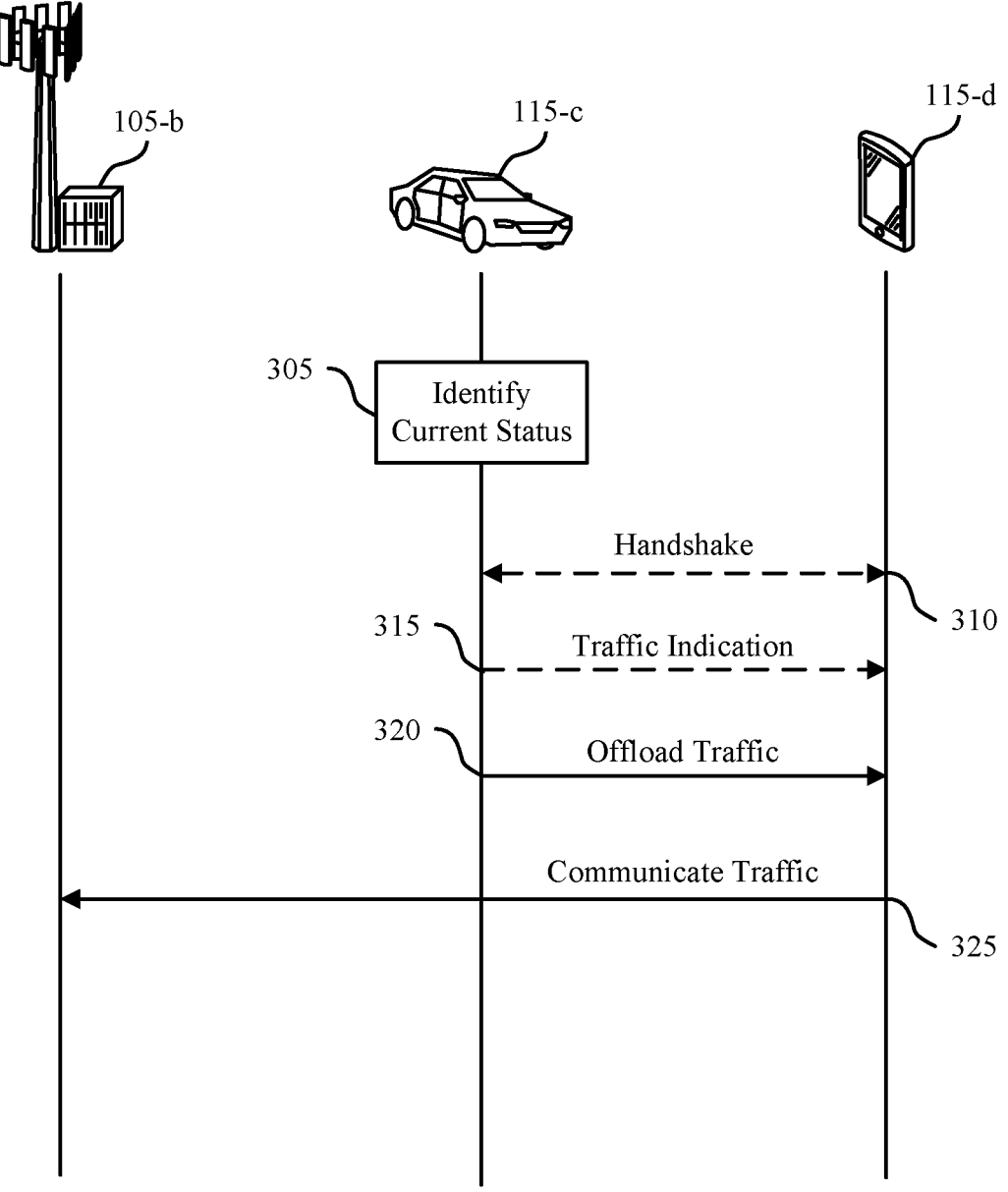
FIG. 3 illustrates an example of a process flow that supports thermal-based UE aggregation for vehicular communication in accordance with one or more aspects of the present disclosure.

FIG. 3 illustrates an example of a process flow 300 that supports thermal-based UE aggregation for vehicular communication in accordance with one or more aspects of the present disclosure. The process flow 300 may implement aspects of the wireless communications system 200 and the wireless communications system 100. For example, the process flow 300 may include a network entity 105-*b*, a UE 115-*c*, and a UE 115-*d*, which may be examples of corresponding devices described with respect to FIG. 1 and FIG. 2. In some cases, the process flow 300 may illustrate the UE 115-*e* triggering an offloading procedure that is transparent to the network entity 105-*b*. Alternative examples of the following may be implemented, where some processes are performed in a different order than described or are not performed. In some cases, processes may include additional features not mentioned below, or further processes may be added.

At 305, the UE 115-*c* may identify a current status of the UE 115-*c*. For example, the UE 115-*c* may be an example of an OBU connected to a vehicle, and may be operable to measure a current temperature of the UE 115-*c* via one or more sensors. In some cases, the UE 115-*c* may trigger an offloading procedure based on identifying the current status of the UE 115-*c*. For example, the UE 115-*c* may identify that its current temperature exceeds a threshold temperature (e.g., a preconfigured threshold), and may determine to offload, to the UE 115-*d*, one or more messages scheduled for transmission from the UE 115-*c*. As another example, the UE 115-*c* may identify that a performance metric of the UE 115-*c* does not satisfy one or more communication criteria, such as a quantity of transmission layers supported by the UE 115-*c*, a maximum modulation order supported by the UE 115-*c*, a maximum MCS index supported by the UE 115-*c*, a maximum transmission power supported by the UE 115-*c*, an indication of degraded performance of the UE 115-*c* (e.g., worsening BLER or decreasing throughput), or any combination thereof.

At 310, the UE 115-*c* and the UE 115-*d* may perform a handshake operation. In some cases, the UE 115-*c* may, based on identifying its current status, transmit a first message including an offloading request. The UE 115-*d* may transmit, in response to the first message, a second message including an acceptance of the offloading request or a rejection of the offloading request. In some cases, the UE 115-*d* may transmit a message including information associated with the UE 115-*d*, such as an ID of the UE 115-*d*. The UE 115-*c* and the UE 115-*d* may communicate via various communication links, such as a sidelink communication link, a cabled connection (e.g., data transfer via a USB interface), an unlicensed spectrum communication link (e.g., a Wi-Fi link, a Bluetooth link, or the like), or any combination thereof.

At 315, the UE 115-*c* may transmit, to the UE 115-*d*, a resource indication (e.g., a first indication) of one or more time-frequency resources for transmitting the one or more messages on behalf of the UE 115-*c*. For example, the UE 115-*c* may indicate a frame number, a slot number, modulation symbol mapping information, or any combination thereof in the resource indication.

At 320, the UE 115-*c* may offload the traffic to the UE 115-*d*. The offloaded traffic may include an application layer message, an IP packet, a TB, a collection of modulation symbols, a frequency domain signal (e.g., a pre-IFFT signal), a time domain signal (e.g., a post-IFFT signal), or any combination thereof.

At 325, the UE 115-*d* may communicate the offloaded traffic to the network entity 105-*b*. For example, the UE 115-*d* may transmit the one or more offloaded messages to the network entity 105-*b* via the one or more time-frequency resources.

FIG. 4 illustrates an example of a process flow 400 that supports thermal-based UE aggregation for vehicular communication in accordance with one or more aspects of the present disclosure. The process flow 400 may implement aspects of the wireless communications system 200 and the wireless communications system 100. For example, the process flow 400 may include a network entity 105-*c*, a UE 115-*e*, and a UE 115-*f*, which may be examples of corresponding devices described with respect to FIG. 1 and FIG. 2. In some cases, the process flow 400 may illustrate the UE 115-*e* triggering an offloading procedure that is non-transparent to the network entity 105-*c*. Alternative examples of the following may be implemented, where some processes are performed in a different order than described or are not performed. In some cases, processes may include additional features not mentioned below, or further processes may be added.

At 405, the UE 115-*e* may identify a current status of the UE 115-*e*. For example, the UE 115-*e* may be an example of an OBU connected to a vehicle, and may be operable to measure a current temperature of the UE 115-*e* via one or more sensors. In some cases, the UE 115-*e* may trigger an offloading procedure based on identifying the current status of the UE 115-*e*. For example, the UE 115-*e* may identify that its current temperature exceeds a threshold temperature (e.g., a preconfigured threshold), and may determine to offload, to the UE 115-*f*, one or more messages scheduled for transmission from the UE 115-*e*. As another example, the UE 115-*e* may identify that a performance metric of the UE 115-*e* does not satisfy one or more communication criteria, such as a quantity of transmission layers supported by the UE 115-*e*, a maximum modulation order supported by the UE 115-*e*, a maximum MCS index supported by the UE 115-*e*, a maximum transmission power supported by the UE 115-*e*, an indication of degraded performance of the UE 115-*e* (e.g., worsening BLER or decreasing throughput), or any combination thereof.

At 410, the UE 115-*e* and the UE 115-*f* may perform a handshake operation. In some cases, the UE 115-*e* may, based on identifying its current status, transmit a first message including an offloading request. The UE 115-*f* may transmit, in response to the first message, a second message including an acceptance of the offloading request or a rejection of the offloading request. In some cases, the UE 115-*f* may transmit a message including information associated with the UE 115-*f*, such as an ID of the UE 115-*f*. The UE 115-*e* and the UE 115-*f* may communicate via various communication links, such as a sidelink communication link, a cabled connection (e.g., data transfer via a USB interface), an unlicensed spectrum communication link (e.g., a Wi-Fi link, a Bluetooth link, or the like), or any combination thereof.

At 415, the UE 115-*e* may transmit an offloading request to the network entity 105-*c*. In some cases, transmitting the offloading request may be based on receiving an acceptance of the offloading request during the handshake operation with the UE 115-*f*. In some other cases, the UE 115-*e* may transmit the offloading request to the network entity 105-*c* without performing the handshake operation with the UE 115-*f*. In some cases, the offloading request may indicate that one or more messages are to be offloaded based on a data rate of the one or more messages exceeding a threshold data rate (e.g., a data rate supported by the UE 115-*e* according to its current status).

At 420, the UE 115-*e* may transmit a report to the network entity 105-*c*. The report may indicate an ID associated with the UE 115-*f*, a BSR associated with the UE 115-*e*, or both.

At 425, the network entity 105-*c* may perform a handshake operation with the UE 115-*f*. In some cases, the network entity 105-*c* may initiate the handshake operation based on receiving the offloading request from the UE 115-*e*. The network entity 105-*c* may transmit a first message including an offloading request to the UE 115-*f*, and the UE 115-*f* may transmit, in response to the first message, a second message including an acceptance of the offloading request or a rejection of the offloading request.

At 430, the network entity 105-*c* may transmit a resource grant to the UE 115-*f* to schedule the offloaded traffic. In some cases, transmitting the resource grant may be based on receiving an acceptance of the offloading request from the UE 115-*f*. The resource grant may indicate one or more time-frequency resources for transmitting one or more messages that are scheduled for transmission from the UE 115-*e* (e.g., offloaded traffic). In some cases, the network entity 105-*c* may select the one or more time-frequency resources based on the BSR associated with the UE 115-*e*.

At 435, the UE 115-*e* may offload the traffic to the UE 115-*f*. The offloaded traffic may include an application layer message, an IP packet, a TB, a collection of modulation symbols, a frequency domain signal (e.g., a pre-IFFT signal), a time domain signal (e.g., a post-IFFT signal), or any combination thereof.

At 440, the UE 115-*f* may communicate the offloaded traffic to the network entity 105-*c*. For example, the UE 115-*f* may transmit the one or more offloaded messages to the network entity 105-*b* via the one or more time-frequency resources indicated in the resource grant.

FIG. 5 illustrates an example of a process flow 500 that supports thermal-based UE aggregation for vehicular communication in accordance with one or more aspects of the present disclosure. The process flow 500 may implement aspects of the wireless communications system 200 and the wireless communications system 100. For example, the process flow 500 may include a network entity 105-*d*, a UE 115-*g*, and a UE 115-*h*, which may be examples of corresponding devices described with respect to FIG. 1 and FIG. 2. In some cases, the process flow 500 may illustrate the network entity 105-*d* triggering an offloading procedure based on reporting from the UE 115-*g*. Alternative examples of the following may be implemented, where some processes are performed in a different order than described or are not performed. In some cases, processes may include additional features not mentioned below, or further processes may be added.

At 505, the UE 115-*g* may identify a current status of the UE 115-*g*. For example, the UE 115-*g* may be an example of an OBU connected to a vehicle, and may be operable to measure a current temperature of the UE 115-*g* via one or more sensors. As another example, the UE 115-*g* may identify a performance metric of the UE 115-*g*, such as a quantity of transmission layers supported by the UE 115-*g*, a maximum modulation order supported by the UE 115-*g*, a maximum MCS index supported by the UE 115-*g*, a maximum transmission power supported by the UE 115-*g*, an indication of a performance of the UE 115-*e* (e.g., a BLER metric or a throughput metric), or any combination thereof.

At 510, the UE 115-*g* may transmit, to the network entity 105-*d*, a status report indicating the identified current status of the UE 115-*g*. In some cases, the status report may include a first indication of a thermal status of the UE 115-*g*, the performance metric of the UE 115-*g*, a second indication that the UE 115-*g* is unable to meet a QoS requirement, or any combination thereof. In some cases, the UE 115-*g* may indicate one or more capabilities of the UE 115-*h* to the network entity 105-*d*.

At 515, the UE 115-*g* may transmit, to the network entity 105-*d*, a traffic indication including an indication of what traffic is to be offloaded and what traffic is not to be offloaded. For example, the UE 115-*g* may be able to perform transmissions with a relatively low data rate (e.g., despite thermal or performance issues), such as BSMs, which may not be offloaded by default. The UE 115-*g* may indicate (e.g., explicitly), to the network entity 105-*d*, the traffic to be offloaded and the traffic not to be offloaded, and may identify the traffic via one or more IP addresses, one or more logical channel IDs, or both.

At 520, the network entity 105-*d* may transmit, to the UE 115-*g*, an offloading trigger. In some cases, the offloading trigger may indicate that the UE 115-*g* is to offload one or more messages to the UE 115-*h* based on a determination that a temperature of the UE 115-*g* satisfies a threshold temperature, a performance metric of the UE 115-*g* fails to satisfy a QoS requirement, or both.

At 525, the network entity 105-*d* may transmit, to the UE 115-*h*, a resource grant. The resource grant may include an indication of one or more time-frequency resources for the UE 115-*h* to use for communicating one or more messages that are scheduled for transmission from the UE 115-*g* (e.g., offloaded traffic). In some cases, the network entity 105-*d* may select the one or more time-frequency resources based on a BSR associated with the UE 115-*g*.

At 530, the UE 115-*g* may offload the traffic to the UE 115-*h*. The offloaded traffic may include an application layer message, an IP packet, a TB, a collection of modulation symbols, a frequency domain signal (e.g., a pre-IFFT signal), a time domain signal (e.g., a post-IFFT signal), or any combination thereof.

At 535, the UE 115-*h* may communicate the offloaded traffic to the network entity 105-*d*. For example, the UE 115-*h* may transmit the one or more offloaded messages to the network entity 105-*d* via the one or more time-frequency resources indicated in the resource grant.

At 540, the UE 115-*g* may communicate a portion of the traffic which has not been offloaded. For example, the UE 115-*g* may transmit one or more messages associated with a data rate which is below a threshold data rate (e.g., BSMs).

FIG. 6 illustrates a block diagram 600 of a device 605 that supports thermal-based UE aggregation for vehicular communication in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to thermal-based UE aggregation for vehicular communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to thermal-based UE aggregation for vehicular communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of thermal-based UE aggregation for vehicular communication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. For example, the communications manager 620 may be configured as or otherwise support a means for receiving a first indication of one or more time-frequency resources for transmitting one or more messages that are scheduled for transmission from a second UE, where receiving the first indication is based on a current status of the second UE. The communications manager 620 may be configured as or otherwise support a means for receiving the one or more messages from the second UE via a communication link between the first UE and the second UE. The communications manager 620 may be configured as or otherwise support a means for transmitting the one or more messages via the one or more time-frequency resources.

Additionally, or alternatively, the communications manager 620 may support wireless communications at a first UE in accordance with examples as disclosed herein. For example, the communications manager 620 may be configured as or otherwise support a means for transmitting a status report indicating a current status of the first UE to a network entity. The communications manager 620 may be configured as or otherwise support a means for receiving, from the network entity and based on transmitting the status report, a first indication that the first UE is to offload, to a second UE, one or more messages that are scheduled for transmission from the first UE. The communications manager 620 may be configured as or otherwise support a means for transmitting, to the second UE, a second indication that the one or more messages are to be offloaded to the second UE. The communications manager 620 may be configured as or otherwise support a means for transmitting, to the second UE, the one or more messages for transmission to the network entity.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more robust communications with devices experiencing thermal issues and reducing a frequency of dropped or delayed packets.

FIG. 7 illustrates a block diagram 700 of a device 705 that supports thermal-based UE aggregation for vehicular communication in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to thermal-based UE aggregation for vehicular communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to thermal-based UE aggregation for vehicular communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of thermal-based UE aggregation for vehicular communication as described herein. For example, the communications manager 720 may include a resource indication reception component 725, a traffic reception component 730, a traffic transmission component 735, a status reporting component 740, an offloading indication reception component 745, an offloading indication transmission component 750, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. The resource indication reception component 725 may be configured as or otherwise support a means for receiving a first indication of one or more time-frequency resources for transmitting one or more messages that are scheduled for transmission from a second UE, where receiving the first indication is based on a current status of the second UE. The traffic reception component 730 may be configured as or otherwise support a means for receiving the one or more messages from the second UE via a communication link between the first UE and the second UE. The traffic transmission component 735 may be configured as or otherwise support a means for transmitting the one or more messages via the one or more time-frequency resources.

Additionally, or alternatively, the communications manager 720 may support wireless communications at a first UE in accordance with examples as disclosed herein. The status reporting component 740 may be configured as or otherwise support a means for transmitting a status report indicating a current status of the first UE to a network entity. The offloading indication reception component 745 may be configured as or otherwise support a means for receiving, from the network entity and based on transmitting the status report, a first indication that the first UE is to offload, to a second UE, one or more messages that are scheduled for transmission from the first UE. The offloading indication transmission component 750 may be configured as or otherwise support a means for transmitting, to the second UE, a second indication that the one or more messages are to be offloaded to the second UE. The traffic transmission component 735 may be configured as or otherwise support a means for transmitting, to the second UE, the one or more messages for transmission to the network entity.

FIG. 8 illustrates a block diagram 800 of a communications manager 820 that supports thermal-based UE aggregation for vehicular communication in accordance with one or more aspects of the present disclosure. The communications manager 820 may be an example of aspects of a communications manager 620, a communications manager 720, or both, as described herein. The communications manager 820, or various components thereof, may be an example of means for performing various aspects of thermal-based UE aggregation for vehicular communication as described herein. For example, the communications manager 820 may include a resource indication reception component 825, a traffic reception component 830, a traffic transmission component 835, a status reporting component 840, an offloading indication reception component 845, an offloading indication transmission component 850, an offloading request reception component 855, a request response transmission component 860, a UE information transmission component 865, or any combination thereof. Each of these components may communicate, directly or indirectly, with one another (e.g., via one or more buses).

The communications manager 820 may support wireless communication at a first UE in accordance with examples as disclosed herein. The resource indication reception component 825 may be configured as or otherwise support a means for receiving a first indication of one or more time-frequency resources for transmitting one or more messages that are scheduled for transmission from a second UE, where receiving the first indication is based on a current status of the second UE. The traffic reception component 830 may be configured as or otherwise support a means for receiving the one or more messages from the second UE via a communication link between the first UE and the second UE. The traffic transmission component 835 may be configured as or otherwise support a means for transmitting the one or more messages via the one or more time-frequency resources.

In some examples, the offloading request reception component 855 may be configured as or otherwise support a means for receiving a first message including an offloading request. In some examples, the request response transmission component 860 may be configured as or otherwise support a means for transmitting, in response to the first message, a second message including an acceptance of the offloading request.

In some examples, the first message is received from the second UE; and the first indication is received from the second UE based on the first message being received from the second UE.

In some examples, the first message is received from a network entity; and the first indication is received from the network entity in a resource grant based on the first message being received from the network entity.

In some examples, the communication link between the first UE and the second UE includes a sidelink communication link, a cabled connection, an unlicensed spectrum communication link, or any combination thereof.

In some examples, the one or more messages include an application layer message, an IP packet, a TB, a set of one or more modulation symbols, a frequency domain signal, a time domain signal, or any combination thereof.

In some examples, the first indication further includes a frame number, a slot number, symbol mapping information, or any combination thereof.

In some examples, the current status of the second UE includes a thermal status of the second UE, a performance metric of the second UE, or both.

In some examples, the UE information transmission component 865 may be configured as or otherwise support a means for transmitting a first message including information associated with the first UE, the information including at least an ID of the first UE.

Additionally, or alternatively, the communications manager 820 may support wireless communications at a first UE in accordance with examples as disclosed herein. The status reporting component 840 may be configured as or otherwise support a means for transmitting a status report indicating a current status of the first UE to a network entity. The offloading indication reception component 845 may be configured as or otherwise support a means for receiving, from the network entity and based on transmitting the status report, a first indication that the first UE is to offload, to a second UE, one or more messages that are scheduled for transmission from the first UE. The offloading indication transmission component 850 may be configured as or otherwise support a means for transmitting, to the second UE, a second indication that the one or more messages are to be offloaded to the second UE. In some examples, the traffic transmission component 835 may be configured as or otherwise support a means for transmitting, to the second UE, the one or more messages for transmission to the network entity.

In some examples, the 870 may be configured as or otherwise support a means for transmitting, to the network entity, a third indication that the one or more messages are to be offloaded based on a data rate of the one or more messages exceeding a threshold data rate, where receiving the first indication is based on transmitting the third indication.

In some examples, the status report includes a first indication of a thermal status of the first UE, a performance metric of the first UE, a second indication that the first UE is unable to meet a QoS requirement, or any combination thereof.

In some examples, the performance metric of the first UE includes quantity of transmission layers supported by the first UE, a maximum MCS order supported by the first UE, a maximum transmission power supported by the first UE, or any combination thereof.

In some examples, the one or more messages include an application layer message, an IP packet, a TB, a set of one or more modulation symbols, a frequency domain signal, a time domain signal, or any combination thereof.

In some examples, the 870 may be configured as or otherwise support a means for transmitting a capability report including one or more capabilities of the second UE, where receiving the first indication is based on transmitting the capability report.

FIG. 9 illustrates a diagram of a system 900 including a device 905 that supports thermal-based UE aggregation for vehicular communication in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bidirectional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting thermal-based UE aggregation for vehicular communication). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving a first indication of one or more time-frequency resources for transmitting one or more messages that are scheduled for transmission from a second UE, where receiving the first indication is based on a current status of the second UE. The communications manager 920 may be configured as or otherwise support a means for receiving the one or more messages from the second UE via a communication link between the first UE and the second UE. The communications manager 920 may be configured as or otherwise support a means for transmitting the one or more messages via the one or more time-frequency resources.

Additionally, or alternatively, the communications manager 920 may support wireless communications at a first UE in accordance with examples as disclosed herein. For example, the communications manager 920 may be configured as or otherwise support a means for transmitting a status report indicating a current status of the first UE to a network entity. The communications manager 920 may be configured as or otherwise support a means for receiving, from the network entity and based on transmitting the status report, a first indication that the first UE is to offload, to a second UE, one or more messages that are scheduled for transmission from the first UE. The communications manager 920 may be configured as or otherwise support a means for transmitting, to the second UE, a second indication that the one or more messages are to be offloaded to the second UE. The communications manager 920 may be configured as or otherwise support a means for transmitting, to the second UE, the one or more messages for transmission to the network entity.

By including or configuring the communications manager 920 in accordance with examples as described herein, the device 905 may support techniques for improved communication reliability for devices experiencing thermal issues or otherwise degraded performance.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of thermal-based UE aggregation for vehicular communication as described herein, or the processor 940 and the memory 930 may be otherwise configured to perform or support such operations.

FIG. 10 illustrates a block diagram 1000 of a device 1005 that supports thermal-based UE aggregation for vehicular communication in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of thermal-based UE aggregation for vehicular communication as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for receiving a first message from a first UE, the first message including a status report for the first UE, an offloading request, or both. The communications manager 1020 may be configured as or otherwise support a means for transmitting, to a second UE based on receiving the first message, an indication of one or more time-frequency resources for communicating one or more messages that are scheduled for transmission from the first UE. The communications manager 1020 may be configured as or otherwise support a means for receiving, from the second UE, the one or more messages via the one or more time-frequency resources.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more robust communications with devices experiencing thermal issues and reducing a frequency of dropped or delayed packets.

FIG. 11 illustrates a block diagram 1100 of a device 1105 that supports thermal-based UE aggregation for vehicular communication in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of thermal-based UE aggregation for vehicular communication as described herein. For example, the communications manager 1120 may include a message reception component 1125, a resource indication transmission component 1130, a traffic reception component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The message reception component 1125 may be configured as or otherwise support a means for receiving a first message from a first UE, the first message including a status report for the first UE, an offloading request, or both. The resource indication transmission component 1130 may be configured as or otherwise support a means for transmitting, to a second UE based on receiving the first message, an indication of one or more time-frequency resources for communicating one or more messages that are scheduled for transmission from the first UE. The traffic reception component 1135 may be configured as or otherwise support a means for receiving, from the second UE, the one or more messages via the one or more time-frequency resources.

FIG. 12 illustrates a block diagram 1200 of a communications manager 1220 that supports thermal-based UE aggregation for vehicular communication in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of thermal-based UE aggregation for vehicular communication as described herein. For example, the communications manager 1220 may include a message reception component 1225, a resource indication transmission component 1230, a traffic reception component 1235, an offloading trigger transmission component 1240, a UE information reception component 1245, a resource selection component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The message reception component 1225 may be configured as or otherwise support a means for receiving a first message from a first UE, the first message including a status report for the first UE, an offloading request, or both. The resource indication transmission component 1230 may be configured as or otherwise support a means for transmitting, to a second UE based on receiving the first message, an indication of one or more time-frequency resources for communicating one or more messages that are scheduled for transmission from the first UE. The traffic reception component 1235 may be configured as or otherwise support a means for receiving, from the second UE, the one or more messages via the one or more time-frequency resources.

In some examples, the offloading trigger transmission component 1240 may be configured as or otherwise support a means for transmitting, to the first UE in response to the first message, a second message including a trigger to offload the one or more messages to the second UE based on a determination that a temperature of the first UE satisfies a threshold temperature, a performance metric of the first UE fails to satisfy a QoS requirement, or both, where receiving the one or more messages from the second UE is based on transmitting the second message.

In some examples, receiving the first message from the first UE is based on a temperature of the first UE satisfying a threshold temperature, a BLER of the first UE satisfying a BLER threshold, a data throughput of the first UE failing to satisfy a data throughput threshold, or any combination thereof.

In some examples, the UE information reception component 1245 may be configured as or otherwise support a means for receiving a second message from the first UE, the second message including an ID associated with the second UE, a BSR associated with the first UE, or both.

In some examples, the resource selection component 1250 may be configured as or otherwise support a means for selecting the one or more time-frequency resources based on the BSR associated with the first UE, where transmitting the indication of the one or more time-frequency resources is based on selecting the one or more time-frequency resources.

In some examples, the first message is received from the first UE via a MAC-CE.

FIG. 13 illustrates a diagram of a system 1300 including a device 1305 that supports thermal-based UE aggregation for vehicular communication in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting thermal-based UE aggregation for vehicular communication). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for receiving a first message from a first UE, the first message including a status report for the first UE, an offloading request, or both. The communications manager 1320 may be configured as or otherwise support a means for transmitting, to a second UE based on receiving the first message, an indication of one or more time-frequency resources for communicating one or more messages that are scheduled for transmission from the first UE. The communications manager 1320 may be configured as or otherwise support a means for receiving, from the second UE, the one or more messages via the one or more time-frequency resources.

By including or configuring the communications manager 1320 in accordance with examples as described herein, the device 1305 may support techniques for improved communication reliability for devices experiencing thermal issues or otherwise degraded performance.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of thermal-based UE aggregation for vehicular communication as described herein, or the processor 1335 and the memory 1325 may be otherwise configured to perform or support such operations.

FIG. 14 illustrates a flowchart showing a method 1400 that supports thermal-based UE aggregation for vehicular communication in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first indication of one or more time-frequency resources for transmitting one or more messages that are scheduled for transmission from a second UE, where receiving the first indication is based on a current status of the second UE. The operations of 1405 may be performed in accordance with examples as disclosed herein. In some examples, aspects of the operations of 1405 may be performed by a resource indication reception component 825 as described with reference to FIG. 8.

At 1410, the method may include receiving the one or more messages from the second UE via a communication link between the first UE and the second UE. The operations of 1410 may be performed in accordance with examples as disclosed herein. In some examples, aspects of the operations of 1410 may be performed by a traffic reception component 830 as described with reference to FIG. 8.

At 1415, the method may include transmitting the one or more messages via the one or more time-frequency resources. The operations of 1415 may be performed in accordance with examples as disclosed herein. In some examples, aspects of the operations of 1415 may be performed by a traffic transmission component 835 as described with reference to FIG. 8.

FIG. 15 illustrates a flowchart showing a method 1500 that supports thermal-based UE aggregation for vehicular communication in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting a status report indicating a current status of the first UE to a network entity. The operations of 1505 may be performed in accordance with examples as disclosed herein. In some examples, aspects of the operations of 1505 may be performed by a status reporting component 840 as described with reference to FIG. 8.

At 1510, the method may include receiving, from the network entity and based on transmitting the status report, a first indication that the first UE is to offload, to a second UE, one or more messages that are scheduled for transmission from the first UE. The operations of 1510 may be performed in accordance with examples as disclosed herein. In some examples, aspects of the operations of 1510 may be performed by an offloading indication reception component 845 as described with reference to FIG. 8.

At 1515, the method may include transmitting, to the second UE, a second indication that the one or more messages are to be offloaded to the second UE. The operations of 1515 may be performed in accordance with examples as disclosed herein. In some examples, aspects of the operations of 1515 may be performed by an offloading indication transmission component 850 as described with reference to FIG. 8.

At 1520, the method may include transmitting, to the second UE, the one or more messages for transmission to the network entity. The operations of 1520 may be performed in accordance with examples as disclosed herein. In some examples, aspects of the operations of 1520 may be performed by a traffic transmission component 835 as described with reference to FIG. 8.

FIG. 16 illustrates a flowchart showing a method 1600 that supports thermal-based UE aggregation for vehicular communication in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include receiving a first message from a first UE, the first message including a status report for the first UE, an offloading request, or both. The operations of 1605 may be performed in accordance with examples as disclosed herein. In some examples, aspects of the operations of 1605 may be performed by a message reception component 1225 as described with reference to FIG. 12.

At 1610, the method may include transmitting, to a second UE based on receiving the first message, an indication of one or more time-frequency resources for communicating one or more messages that are scheduled for transmission from the first UE. The operations of 1610 may be performed in accordance with examples as disclosed herein. In some examples, aspects of the operations of 1610 may be performed by a resource indication transmission component 1230 as described with reference to FIG. 12.

At 1615, the method may include receiving, from the second UE, the one or more messages via the one or more time-frequency resources. The operations of 1615 may be performed in accordance with examples as disclosed herein. In some examples, aspects of the operations of 1615 may be performed by a traffic reception component 1235 as described with reference to FIG. 12.

The following provides an overview of aspects of the present disclosure:

Aspect 1: A method for wireless communication at a first UE, comprising: receiving a first indication of one or more time-frequency resources for transmitting one or more messages that are scheduled for transmission from a second UE, wherein receiving the first indication is based at least in part on a current status of the second UE; receiving the one or more messages from the second UE via a communication link between the first UE and the second UE; and transmitting the one or more messages via the one or more time-frequency resources.

Aspect 2: The method of aspect 1, further comprising: receiving a first message comprising an offloading request; and transmitting, in response to the first message, a second message comprising an acceptance of the offloading request.

Aspect 3: The method of aspect 2, wherein the first message is received from the second UE; and the first indication is received from the second UE based at least in part on the first message being received from the second UE.

Aspect 4: The method of aspect 2, wherein the first message is received from a network entity; and the first indication is received from the network entity in a resource grant based at least in part on the first message being received from the network entity.

Aspect 5: The method of any of aspects 1 through 4, wherein the communication link between the first UE and the second UE comprises a sidelink communication link, a cabled connection, an unlicensed spectrum communication link, or any combination thereof.

Aspect 6: The method of any of aspects 1 through 5, wherein the one or more messages comprise an application layer message, an IP packet, a TB, a set of one or more modulation symbols, a frequency domain signal, a time domain signal, or any combination thereof.

Aspect 7: The method of any of aspects 1 through 6, wherein the first indication further comprises a frame number, a slot number, symbol mapping information, or any combination thereof.

Aspect 8: The method of any of aspects 1 through 7, wherein the current status of the second UE comprises a thermal status of the second UE, a performance metric of the second UE, or both.

Aspect 9: The method of any of aspects 1 through 8, further comprising: transmitting a first message comprising information associated with the first UE, the information comprising at least an ID of the first UE.

Aspect 10: A method for wireless communications at a first UE, comprising: transmitting a status report indicating a current status of the first UE to a network entity; receiving, from the network entity and based at least in part on transmitting the status report, a first indication that the first UE is to offload, to a second UE, one or more messages that are scheduled for transmission from the first UE; transmitting, to the second UE, a second indication that the one or more messages are to be offloaded to the second UE; and transmitting, to the second UE, the one or more messages for transmission to the network entity.

Aspect 11: The method of aspect 10, further comprising: transmitting, to the network entity, a third indication that the one or more messages are to be offloaded based at least in part on a data rate of the one or more messages exceeding a threshold data rate, wherein receiving the first indication is based at least in part on transmitting the third indication.

Aspect 12: The method of any of aspects 10 through 11, wherein the status report comprises a first indication of a thermal status of the first UE, a performance metric of the first UE, a second indication that the first UE is unable to meet a QoS requirement, or any combination thereof.

Aspect 13: The method of aspect 12, wherein the performance metric of the first UE comprises quantity of transmission layers supported by the first UE, a maximum MCS order supported by the first UE, a maximum transmission power supported by the first UE, or any combination thereof.

Aspect 14: The method of any of aspects 10 through 13, wherein the one or more messages comprise an application layer message, an IP packet, a TB, a set of one or more modulation symbols, a frequency domain signal, a time domain signal, or any combination thereof.

Aspect 15: The method of any of aspects 10 through 14, further comprising: transmitting a capability report comprising one or more capabilities of the second UE, wherein receiving the first indication is based at least in part on transmitting the capability report.

Aspect 16: A method for wireless communication at a network entity, comprising: receiving a first message from a first UE, the first message comprising a status report for the first UE, an offloading request, or both; transmitting, to a second UE based at least in part on receiving the first message, an indication of one or more time-frequency resources for communicating one or more messages that are scheduled for transmission from the first UE; and receiving, from the second UE, the one or more messages via the one or more time-frequency resources.

Aspect 17: The method of aspect 16, further comprising: transmitting, to the first UE in response to the first message, a second message comprising a trigger to offload the one or more messages to the second UE based at least in part on a determination that a temperature of the first UE satisfies a threshold temperature, a performance metric of the first UE fails to satisfy a QoS requirement, or both, wherein receiving the one or more messages from the second UE is based at least in part on transmitting the second message.

Aspect 18: The method of any of aspects 16 through 17, wherein receiving the first message from the first UE is based at least in part on a temperature of the first UE satisfying a threshold temperature, a BER of the first UE satisfying a BER threshold, a data throughput of the first UE failing to satisfy a data throughput threshold, or any combination thereof.

Aspect 19: The method of any of aspects 16 through 18, further comprising: receiving a second message from the first UE, the second message comprising an ID associated with the second UE, a BSR associated with the first UE, or both.

Aspect 20: The method of aspect 19, further comprising: selecting the one or more time-frequency resources based at least in part on the BSR associated with the first UE, wherein transmitting the indication of the one or more time-frequency resources is based at least in part on selecting the one or more time-frequency resources.

Aspect 21: The method of any of aspects 16 through 20, wherein the first message is received from the first UE via a MAC-CE.

Aspect 22: An apparatus for wireless communication at a first UE, comprising a processor; memory coupled with the processor; and instructions stored in the memory and executable by the processor to cause the apparatus to perform a method of any of aspects 1 through 9.

Aspect 23: An apparatus for wireless communication at a first UE, comprising at least one means for performing a method of any of aspects 1 through 9.

Aspect 24: A non-transitory computer-readable medium storing code for wireless communication at a first UE, the code comprising instructions executable by a processor to perform a method of any of aspects 1 through 9.

Aspect 25: An apparatus for wireless communications at a first UE, comprising a processor; memory coupled with the processor; and instructions stored in the memory and executable by the processor to cause the apparatus to perform a method of any of aspects 10 through 15.

Aspect 26: An apparatus for wireless communications at a first UE, comprising at least one means for performing a method of any of aspects 10 through 15.

Aspect 27: A non-transitory computer-readable medium storing code for wireless communications at a first UE, the code comprising instructions executable by a processor to perform a method of any of aspects 10 through 15.

Aspect 28: An apparatus for wireless communication at a network entity, comprising a processor; memory coupled with the processor; and instructions stored in the memory and executable by the processor to cause the apparatus to perform a method of any of aspects 16 through 21.

Aspect 29: An apparatus for wireless communication at a network entity, comprising at least one means for performing a method of any of aspects 16 through 21.

Aspect 30: A non-transitory computer-readable medium storing code for wireless communication at a network entity, the code comprising instructions executable by a processor to perform a method of any of aspects 16 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories and individually or collectively operable to execute the code to cause the UE to:

receive a first indication of one or more time-frequency resources for transmitting one or more messages that are scheduled for transmission from an on-board unit of a vehicle to a network entity, wherein receiving the first indication is based at least in part on a current status of the on-board unit, and the UE being paired with the on-board unit;

receive the one or more messages from the on-board unit via a communication link between the UE and the on-board unit; and transmit, based at least in part on reception of the one or more messages from the on-board unit, the one or more messages to the network entity via the one or more time-frequency resources for transmitting the one or more messages that are scheduled for transmission from the on-board unit to the network entity.

2. The UE of claim 1, wherein the one or more processors are individually or collectively further operable to execute the code to cause the UE to:

receive a first message comprising an offloading request; and transmit, in response to the first message, a second message comprising an acceptance of the offloading request.

3. The UE of claim 2, wherein:

the first message is received from the on-board unit; and the first indication is received from the on-board unit based at least in part on the first message being received from the on-board unit.

4. The UE of claim 2, wherein:

the first message is received from a network entity; and the first indication is received from the network entity in a resource grant based at least in part on the first message being received from the network entity.

5. The UE of claim 1, wherein the communication link between the UE and the on-board unit comprises a sidelink communication link, a cabled connection, an unlicensed spectrum communication link, or any combination thereof.

6. The UE of claim 1, wherein the one or more messages comprise an application layer message, an internet protocol packet, a transport block, a set of one or more modulation symbols, a frequency domain signal, a time domain signal, or any combination thereof.

7. The UE of claim 1, wherein the first indication further comprises a frame number, a slot number, symbol mapping information, or any combination thereof.

8. The UE of claim 1, wherein the current status of the on-board unit comprises a thermal status of the on-board unit, and wherein reception of the first indication is based at least in part on a temperature of the on-board unit exceeding a threshold temperature.

9. The UE of claim 1, wherein the one or more processors are individually or collectively further operable to execute the code to cause the UE to:

transmit a first message comprising information associated with the UE, the information comprising at least an identifier of the UE.

10. An on-board unit for wireless communication, comprising:

one or more memories storing processor-executable code; and one or more processors coupled with the one or more memories and individually or collectively operable to execute the code to cause the on-board unit to:

transmit a status report indicating a current status of the on-board unit of a vehicle to a network entity;

receive, from the network entity and based at least in part on transmitting the status report, a first indication that the on-board unit is to offload, to a UE, one or more messages that are scheduled for transmission from the on-board unit to the network entity, wherein receiving the first indication is based at least in part on the UE being paired with the on-board unit;

transmit, to the UE, a second indication that the one or more messages are to be offloaded to the UE based at least in part on the current status of the on-board unit of the vehicle; and transmit, to the UE, the one or more messages for transmission to the network entity via one or more time-frequency resources for transmitting the one or more messages that are scheduled for transmission from the on-board unit to the network entity.

11. The on-board unit of claim 10, wherein the one or more processors are individually or collectively further operable to execute the code to cause the on-board unit to:

transmit, to the network entity, a third indication that the one or more messages are to be offloaded based at least in part on a data rate of the one or more messages exceeding a threshold data rate, wherein receiving the first indication is based at least in part on transmitting the third indication.

12. The on-board unit of claim 10, wherein the status report comprises a first indication of a thermal status of the on-board unit, and wherein reception of the first indication is based at least in part on a temperature of the on-board unit exceeding a threshold temperature.

13. The on-board unit of claim 10, wherein the status report comprises performance metric of the on-board unit, wherein the performance metric comprises quantity of transmission layers supported by the on-board unit, a maximum modulation and coding scheme order supported by the on-board unit, a maximum transmission power supported by the on-board unit, or any combination thereof.

14. The on-board unit of claim 10, wherein the one or more messages comprise an application layer message, an internet protocol packet, a transport block, a set of one or more modulation symbols, a frequency domain signal, a time domain signal, or any combination thereof.

15. The on-board unit of claim 10, wherein the one or more processors are individually or collectively further operable to execute the code to cause the on-board unit to:

transmit a capability report comprising one or more capabilities of the UE, wherein receiving the first indication is based at least in part on transmitting the capability report.

16. A network entity for wireless communications, comprising:

one or more memories storing processor-executable code; and one or more processors coupled with the one or more memories and individually or collectively operable to execute the code to cause the network entity to:

receive a first message from an on-board unit of a vehicle, the first message comprising a status report for the on-board unit, an offloading request, or both;

transmit, to a UE based at least in part on receiving the first message, an indication of one or more time-frequency resources for communicating one or more messages that are scheduled for transmission from the on-board unit to the network entity, wherein transmitting the indication is based at least in part on the second UE being paired with the on-board unit; and receive, from the UE, the one or more messages via the one or more time-frequency resources for transmitting the one or more messages that are scheduled for transmission from the on-board unit to the network entity.

17. The network entity of claim 16, wherein the one or more processors are individually or collectively further operable to execute the code to cause the network entity to:

transmit, to the on-board unit in response to the first message, a second message comprising a trigger to offload the one or more messages to the UE based at least in part on a determination that a temperature of the on-board unit exceeds a threshold temperature, wherein receiving the one or more messages from the UE is based at least in part on transmitting the second message.

18. The network entity of claim 16, wherein receiving the first message from the on-board unit is based at least in part on a performance metric of the on-board unit failing to satisfy a quality of service requirement, a block error rate of the on-board unit satisfying a block error rate threshold, a data throughput of the on-board unit failing to satisfy a data throughput threshold, or any combination thereof.

19. The network entity of claim 16, wherein the one or more processors are individually or collectively further operable to execute the code to cause the network entity to:

receive a second message from the on-board unit, the second message comprising an identifier associated with the UE, a buffer status report associated with the on-board unit, or both.

20. The network entity of claim 19, wherein the one or more processors are individually or collectively further operable to execute the code to cause the network entity to:

select the one or more time-frequency resources based at least in part on the buffer status report associated with the on-board unit, wherein transmitting the indication of the one or more time-frequency resources is based at least in part on selecting the one or more time-frequency resources.

21. The network entity of claim 16, wherein the first message is received from the on-board unit via a media access control control element.

22. A method for wireless communication at a user equipment (UE), comprising:

receiving a first indication of one or more time-frequency resources for transmitting one or more messages that are scheduled for transmission from an on-board unit of a vehicle to a network entity, wherein receiving the first indication is based at least in part on a current status of the on-board unit, and the UE being paired with the on-board unit;

receiving the one or more messages from the on-board unit via a communication link between the UE and the on-board unit; and transmitting, based at least in part on reception of the one or more messages from the on-board unit, the one or more messages to the network entity via the one or more time-frequency resources for transmitting the one or more messages that are scheduled for transmission from the on-board unit to the network entity.

23. The method of claim 22, further comprising:

receiving a first message comprising an offloading request; and transmitting, in response to the first message, a second message comprising an acceptance of the offloading request.

24. The method of claim 23, wherein:

the first message is received from the on-board unit; and the first indication is received from the on-board unit based at least in part on the first message being received from the on-board unit.

25. The method of claim 23, wherein:

the first message is received from a network entity; and the first indication is received from the network entity in a resource grant based at least in part on the first message being received from the network entity.

26. The method of claim 22, wherein the communication link between the UE and the on-board unit comprises a sidelink communication link, a cabled connection, an unlicensed spectrum communication link, or any combination thereof.

27. The method of claim 22, wherein the one or more messages comprise an application layer message, an internet protocol packet, a transport block, a set of one or more modulation symbols, a frequency domain signal, a time domain signal, or any combination thereof.

28. The method of claim 22, wherein the first indication further comprises a frame number, a slot number, symbol mapping information, or any combination thereof.

29. The method of claim 22, wherein the current status of the on-board unit comprises a thermal status of the on-board unit, and wherein reception of the first indication is based at least in part on a temperature of the on-board unit exceeding a threshold temperature.

30. The method of claim 22, further comprising:

transmitting a first message comprising information associated with the UE, the information comprising at least an identifier of the UE.

\* \* \* \* \*